United States Patent
Yamagata et al.

(10) Patent No.: US 8,018,816 B2
(45) Date of Patent: Sep. 13, 2011

(54) OBJECTIVE LENS AND OPTICAL INFORMATION RECORDING/REPRODUCING APPARATUS

(75) Inventors: Naoki Yamagata, Tokyo (JP); Shuichi Takeuchi, Saitama (JP)

(73) Assignee: Hoya Corporation, Tokyo (JP)

( * ) Notice: Subject to any disclaimer, the term of this patent is extended or adjusted under 35 U.S.C. 154(b) by 162 days.

(21) Appl. No.: 12/609,273

(22) Filed: Oct. 30, 2009

(65) Prior Publication Data

US 2010/0110861 A1 May 6, 2010

(30) Foreign Application Priority Data

Nov. 4, 2008 (JP) ................................. 2008-283091

(51) Int. Cl.
*G11B 7/135* (2006.01)
(52) U.S. Cl. ................................................. 369/112.23
(58) Field of Classification Search .................. None
See application file for complete search history.

(56) References Cited

U.S. PATENT DOCUMENTS

| | | | |
|---|---|---|---|
| 6,819,504 B2 | 11/2004 | Maruyama | |
| 7,110,344 B2 | 9/2006 | Kimura | |
| 7,929,401 B2 * | 4/2011 | Yamagata et al. | 369/112.23 |
| 2003/0123372 A1 | 7/2003 | Kimura | |
| 2003/0156334 A1 | 8/2003 | Maruyama | |
| 2003/0235138 A1 * | 12/2003 | Kimura | 369/112.24 |
| 2004/0105376 A1 * | 6/2004 | Kubo | 369/112.23 |
| 2007/0121470 A1 | 5/2007 | Nakamura et al. | |
| 2007/0286054 A1 | 12/2007 | Koizumi et al. | |
| 2007/0297314 A1 | 12/2007 | Koreeda et al. | |
| 2008/0089207 A1 | 4/2008 | Koreeda et al. | |
| 2008/0106998 A1 * | 5/2008 | Ito | 369/112.24 |
| 2008/0259775 A1 * | 10/2008 | Yamagata et al. | 369/112.23 |
| 2009/0154325 A1 | 6/2009 | Inoue et al. | |
| 2009/0252021 A1 | 10/2009 | Inoue et al. | |

FOREIGN PATENT DOCUMENTS

| | | |
|---|---|---|
| JP | 2003-5032 | 1/2003 |
| JP | 2003-85806 | 3/2003 |
| JP | 2005-156719 | 6/2005 |
| JP | 2007-179720 | 7/2007 |

OTHER PUBLICATIONS

English language Abstract of JP 2005-156719, Jun. 16, 2005.
English language Abstract of JP 2007-179720, Jul. 12, 2007.
English language Abstract of JP 2003-85806, Mar. 20, 2003.
English language Abstract of JP 2003-5032, Jan. 8, 2003.

* cited by examiner

*Primary Examiner* — Christopher Lamb
(74) *Attorney, Agent, or Firm* — Greenblum & Bernstein P.L.C.

(57) ABSTRACT

A resin objective lens having a numerical aperture NA≧0.75. The objective lens satisfies a condition:

$$0 \leq |SC|_{MAX} \cdot f < 0.002$$

where f denotes a focal length at a wavelength λ and $|SC|_{MAX}$ denotes a maximum absolute value of an offence against a sine condition in a range larger than or equal to 0% and smaller than 90% of an effective beam radius with respect to an optical axis. The objective lens is configured such that the offence against the sine condition at a 100% point of the effective beam radius is smaller than that defined at a 90% point. At least a light source side surface of the objective lens is formed to be an aspherical surface, and the objective lens satisfies a condition:

$$1.40 < (n-1) \cdot (SAG1)'_{MAX} / NA^2 < 1.95$$

where $(SAG1)'_{MAX}$ represents a maximum gradient of the light source side surface within an effective beam diameter.

14 Claims, 20 Drawing Sheets

OBJECTIVE LENS AND OPTICAL INFORMATION RECORDING/REPRODUCING APPARATUS

BACKGROUND OF THE INVENTION

The present invention relates to an objective lens which is installed in an optical information recording/reproducing apparatus for recording information to and/or reproducing information from an optical disc complying with a predetermined standard. More specifically, the present invention relates to an objective lens made of resin (hereafter, frequently referred to as a resin lens) having a numerical aperture larger than or equal to 0.75 which is suitable for information recording/reproducing for a high-recording density optical disc, such as a BD (Blu-ray Disc).

There exist various standards of optical discs (CD, DVD, etc.) differing in recording density, protective layer thickness, etc. Meanwhile, high-recording density optical discs (e.g., BD), having still higher recording density than DVD, are being brought into practical use in recent years to realize still higher information storage capacity. Incidentally, in this specification, the "optical information recording/reproducing apparatuses" include apparatuses for both information reproducing and information recording, apparatuses exclusively for information reproducing, and apparatuses exclusively for information recording.

Since the high-recording density optical disc has the higher recording density than DVD and CD, a beam spot having a relatively small diameter is required for information recording and reproducing for the high-recording density optical disc. That is, a relatively large NA is required for information recording/reproducing (i.e., information recording and/or information reproducing) for the high-recording density optical disc. For this reason, in general a glass lens having a relatively high refractive index is used as an objective lens for the optical information recording/reproducing apparatus as described in Japanese Patent Provisional Publication No. 2005-156719A (hereafter, referred to as JP2005-156719A). However, a glass lens has a drawback that since a glass lens is heavy in weight, the glass lens places a burden on operation of an actuator for driving the lens when the actuator moves the lens in a focusing direction or in a tracking direction.

Therefore, a designer might consider forming a lens with resin in place of glass as material in order to reduce weight of the lens. By achieving the weight reduction through use of the resign as material of the lens, it is possible to reduce the burden to be placed on the actuator for driving the objective lens. Furthermore, forming the objective lens for the high-recording density optical disc with resin provides advantages in regard to easiness of production, a high degree of productivity and cost. An example of a resin objective lens is disclosed, for example, in Japanese Patent Provisional Publication No. 2007-179720A (hereafter, referred to as JP2007-179720A).

SUMMARY OF THE INVENTION

Incidentally, regarding the change rate of the refractive index of lens material caused when the temperature change occurs, the change rate of the refractive index of resign is approximately ten times larger than the change rate of the refractive index of glass. Therefore, a lens made of resin has a drawback that the change amount of the spherical aberration due to change of the refractive index (i.e., due to temperature change) is considerably larger than that of a lens made of glass. For example, if an objective lens disclosed in JP2007-179720A is used in an environmental condition having a temperature difference with respect to the design temperature, a relatively large amount of spherical aberration may be caused, and thereby a possibility that the information recording/reproducing for the high-recording density optical disc can not be performed properly arises.

An objective lens disclosed in Japanese Patent Provisional Publication No. 2003-85806A (hereafter, referred to as JP2003-85806A) is configured to cancel the spherical aberration caused by the difference of the thicknesses of optical discs with the spherical aberration caused by change of the degree of divergence of an incident light beam. That is, the objective lens is designed to intentionally cause the offence against the sine condition. Since the objective lens does not suitably correct the offence against the sine condition within the effective diameter of the lens, the objective lens has a drawback that when an off-axis light beam enters the lens due to, for example, an assembling error, a relatively large amount of off-axis coma is caused and thereby the performance of the objective lens deteriorates.

The objective lens disclosed in JP2007-179720A is required to compensate for the decrease of the lens power due to decrease of the refractive index caused when resin is used as material of the lens in place of glass. In order to compensate for decrease of the lens power due to decrease of the refractive index, it is required to increase the lens power, for example, by increasing the curvature of each lens surface of the objective lens. However, if the curvature of a lens surface is increased, it becomes necessary to increase the lens thickness (i.e., the thickness of the central part of the lens) in order to secure the thickness of the lens at the outermost part thereof (hereafter, frequently referred to as a peripheral thickness). In this case, it becomes difficult to secure an appropriate working distance between the surface of the protective layer of the optical disc and the optical disc side surface of the objective lens.

The present invention is advantageous in that it provides at least one of an objective lens made of resign and an optical information recording/reproducing apparatus configured to suitably perform information recording/reproducing for the high recording density optical disc, while suitably correcting the aberrations including a coma and the spherical aberration, and decreasing the lens thickness.

According to an aspect of the invention, there is provided an objective lens used for an optical information recording/reproducing apparatus for recording information to and/or reproducing information from an optical disc based on a predetermined standard. The objective lens is made of resin and has a numerical aperture larger than or equal to 0.75. The objective lens satisfies a condition:

$$0 \leq |SC|_{MAX} \cdot f < 0.002 \quad (1)$$

where f denotes a focal length (unit: mm) of the objective lens with respect to a wavelength λ (unit: nm) used for recording information to and/or reproducing information from the optical disc, and $|SC|_{MAX}$ denotes a maximum value of an absolute value an offence against a sine condition defined in a range larger than or equal to 0% and smaller than 90% of an effective beam radius with respect to an optical axis of the objective lens. The objective lens is configured such that the offence against the sine condition at a 100% point of the effective beam radius is smaller than the offence against the sine condition at a 90% point of the effective beam radius. At least a light source side surface of the objective lens is formed to be an aspherical surface.

In this configuration, when SAG denotes a sag amount defined as a distance between a point on the aspherical surface at a height of h (unit: mm) from the optical axis and a plane tangential to the aspherical surface at the optical axis, r denotes a curvature radius (unit: mm) of the aspherical surface on the optical axis, κ denotes a conical coefficient, and $A_4, A_6, \ldots$ denote aspherical coefficients larger than or equal to the fourth order, a gradient (SAG)' of the aspherical surface at the height h is expressed by:

$$(SAG)' = \frac{d(SAG)}{dh};$$

where, $$SAG = \frac{\frac{h^2}{r}}{1+\sqrt{1-(1+\kappa)\left(\frac{h}{r}\right)^2}} + A_4 h^4 + A_6 h^6 + A_8 h^8 + \ldots .$$

Further, the objective lens is configured to satisfy a condition:

$$1.40 < (n-1) \cdot (SAG1)'_{MAX}/NA^2 < 1.95 \quad (2),$$

where $(SAG1)'_{MAX}$ represents a maximum gradient of the light source side surface within an effective beam diameter, n denotes a refractive index of the objective lens at the wavelength λ, and NA denotes the numerical aperture of the objective lens defined on a side of the optical disc when the wavelength λ is used.

With this configuration, it becomes possible to provide an objective lens made of resign configured to achieve the suitable optical performance for information recording/reproducing for a high-recording density optical disc and to effectively suppress increase of the lens thickness thereof while suitably correcting the coma and the spherical aberration due to the temperature change.

In at least one aspect, when $SC_{0.9}$ denotes the offence against the sine condition at the 90% point of the effective beam radius, and $SC_{1.0}$ denotes the offence against the sine condition at the 100% point of the effective beam radius, the objective lens may further satisfy a condition:

$$-0.010 \leq (SC_{1.0} - SC_{0.9}) \leq -0.001 \quad (3).$$

In at least one aspect, when d (unit: mm) denotes a lens thickness of the objective lens on the optical axis, the objective lens may further satisfy a condition:

$$1.70 < d \cdot n/f < 2.10 \quad (4).$$

In at least one aspect, the objective lens may further satisfy a condition:

$$0.70 < f < 1.50 \quad (5).$$

In at least one aspect, the objective lens may further satisfy a condition:

$$1.50 < n < 1.66 \quad (6).$$

In at least one aspect, the wavelength λ may satisfy a condition:

$$380 < \lambda < 420 \quad (7).$$

In at least one aspect, the objective lens may be configured such that the offence against the sine condition continuously decreases within a range of 90 to 100% of the effective beam radius as a pupil coordinate increases.

According to another aspect of the invention, there is provided an optical information recording/reproducing apparatus for recording information to and/or reproducing information from an optical disc based on a predetermined standard by using a light beam having a wavelength λ. The optical information recording/reproducing apparatus is provided with a light source that emits the light beam having the wavelength λ, and one of the above described objective lens.

BRIEF DESCRIPTION OF THE
ACCOMPANYING DRAWINGS

DETAILED DESCRIPTION OF THE EMBODIMENTS

Hereinafter, an embodiment according to the invention is described with reference to the accompanying drawings. An optical information recording/reproducing apparatus 100 according to the embodiment is configured to record information to and/or reproduce information from an optical disc based on a predetermined standard (e.g., BD).

Figure 1:
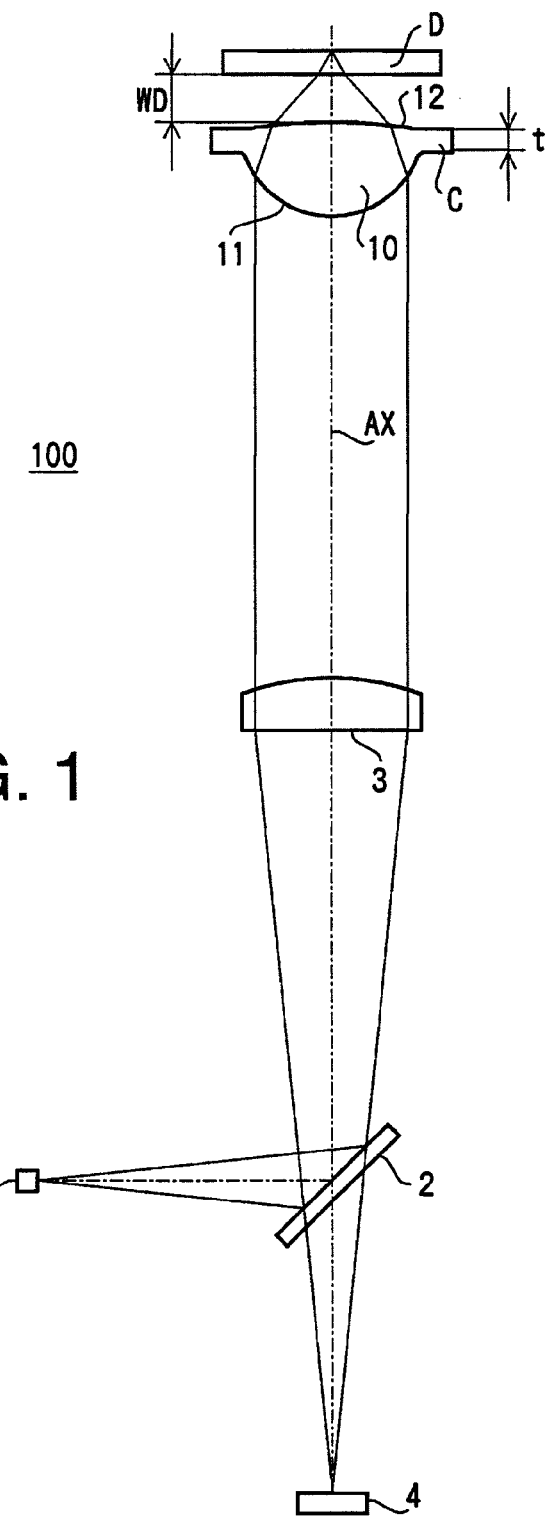
FIG. 1 illustrates a general configuration of an optical information recording/reproducing apparatus having an objective lens according to an embodiment of the invention.

FIG. 1 illustrates a general configuration of the optical information recording/reproducing apparatus 100 having an objective lens 10 according to the embodiment. As shown in FIG. 1, the optical information recording/reproducing apparatus 100 includes a light source 1, a half mirror 2, a collimator 3, a photoreceptor 4, and the objective lens 10.

In FIG. 1, a reference axis AX of the optical information recording/reproducing apparatus 100 is indicated by a chain line. In FIG. 1, each of a light beam proceeding to an optical disc D and a returning light beam from the optical disc D is indicated by a solid line. In a normal state, an optical axis of the objective lens 10 coincides with the reference axis AX. It should be noted that the optical axis of the objective lens 10 shifts from the reference axis AX, for example, during a tracking operation. In this embodiment, a required numerical aperture which the objective lens 10 should satisfy is larger than or equal to 0.75.

The optical disc D has a protective layer and a recording surface (not shown). Practically, the recording surface is sandwiched between the protective layer and a substrate layer or a label layer. When information recording/reproducing (i.e., information recording and/or information reproducing) is performed, the optical disc D is placed on a turn table (not shown).

The light source 1 is a semiconductor laser which emits a blue laser light beam having a design wavelength of 406 nm. In consideration of the use environment and individual differences of light sources, the wavelength $\lambda$ (unit: nm) of the laser beam of the light source 1 fluctuates within a range represented by a following condition (7).

$$380 < \lambda < 420 \quad (7)$$

As shown in FIG. 1, the laser beam emitted from the light source 1 is deflected by the half mirror 2 to be incident on the collimator 3. Then, the laser beam is converted into a collimated beam by the collimator 3, and thereafter is incident on a first surface 11 of the objective lens 10. Then, the laser beam exits from the objective lens 10 through a second surface 12. Through the objective lens 10, the laser beam is converged at the vicinity of the recording surface of the optical disc D. As a result, a suitable beam spot in which aberrations have been suitably corrected is formed at the vicinity of the recording surface of the optical disc D. The laser beam reflected by the recording surface of the optical disc D returns along the same optical path as that of the laser beam proceeding to the optical disc D, passes through the half mirror 2, and is finally received by the photoreceptor 4.

The photoreceptor 4 executes photoelectric conversion with respect to received light, and outputs an analog signal to a signal processing circuit (not shown). The signal processing circuit converts the analog signal into a bit stream and executes an error correction process for the inputted signal. Then, the signal processing circuit divides the bit stream for which the error correction has been executed into various types of streams including an audio stream and a video stream, and decodes each divided stream. The signal processing circuit converts an audio signal and a video signal which are obtained by decoding the streams into analog signals, and outputs the analog signals to a speaker and a display (not shown), respectively. Consequently, sound and video recorded on the optical disc D are reproduced through the speaker and the display, respectively.

If a glass lens is employed as the objective lens 10, a problem that a considerable burden is placed on an actuator (not shown) for driving the objective lens 10 arises. Therefore, in this embodiment, resin is employed as material of the objective lens 10, so that the weight reduction is achieved in comparison with the case where the objective lens 10 is made of glass. It should be understood that the objective lens 10 made of resin also provides advantages in regard to easiness of manufacturing, the high degree of productivity and cost relative to a glass lens. Furthermore, the objective lens 10 is designed to limit the curvature of the first surface 11 so as to effectively suppress increase of the lens thickness even when the objective lens 10 is made of resin.

Since the objective lens 10 is made of resin, the objective lens 10 has a relatively low refractive index with respect to a glass lens. The refractive index n of the objective lens 10 with respect to the wavelength $\lambda$ is represented by a following condition (6).

$$1.50 < n < 1.66 \quad (6)$$

Each of the first surface 11 and the second surface 12 of the objective lens 10 is an aspherical surface. A shape of an aspherical surface is expressed by a following equation:

$$SAG = \frac{\frac{h^2}{r}}{1 + \sqrt{1 - (1+\kappa)\left(\frac{h}{r}\right)^2}} + A_4 h^4 + A_6 h^6 + A_8 h^8 + \ldots$$

where, SAG (a sag amount) is a distance between a point on the aspherical surface at a height of h (unit: mm) from the optical axis and a plane tangential to the aspherical surface at the optical axis, r is a curvature radius (unit: mm) of the aspherical surface on the optical axis (i.e., 1/r represents a curvature of the aspherical surface on the optical axis), $\kappa$ is a conical coefficient, and $A_4, A_6, \ldots$ represent aspherical coefficients larger than or equal to the fourth order.

By forming each lens surface of the objective lens 10 to be an aspherical surface, it becomes possible to control appropriately the aberrations including a spherical aberration and a coma.

The objective lens 10 is configured to satisfy a following condition (1):

$$0 \leq |SC|_{MAX}/f < 0.002 \quad (1)$$

where f denotes a focal length (unit: mm) of the objective lens 10 with respect to the wavelength λ, and $|SC|_{MAX}$ denotes the maximum value of the absolute value of the offence against the sine condition defined in the range larger than or equal to 0% and smaller than 90% of the effective beam radius with respect to the optical axis of the objective lens 10. Furthermore, the objective lens 10 is configured such that the offence against the sine condition at the 100% point of the effective beam radius is smaller than the offence against the sine condition at the 90% point of the effective beam radius. By configuring the objective lens 10 such that the offence against the sine condition is corrected in the range larger than or equal to 0% and smaller than 90% of the effective beam radius, it becomes possible to effectively suppress the off-axis aberrations, such as a coma, due to the tracking shift of the objective lens 10. Furthermore, by setting the offence against the sine condition at the 100% point of the effective beam radius to be smaller than the offence against the sine condition at the 90% point of the effective beam radius, it becomes possible to effectively suppress the change amount of the spherical aberration due to the temperature change.

When the objective lens 10 is configured such that the offence against the sine condition continuously decreases within the range of 90 to 100% of the effective beam radius as the pupil coordinate increases, it becomes possible to suppress further effectively the change amount of the spherical aberration due to the temperature change. In the following, a condition representing a configuration where the offence against the sine condition at the 100% point of the effective beam radius is set to be smaller than the offence against the sine condition at the 90% point of the effective beam radius is referred to as "condition (1')".

If the objective lens 10 does not satisfy the condition (1), the amount of coma becomes large, and therefore the reproducing performance for the optical disc D deteriorates. If the objective lens 10 does not satisfy the condition (1'), i.e., if the offence against the sine condition at the 100% point of the effective beam radius is set to be larger than (or equal to) the offence against the sine condition at the 90% point of the effective beam radius, the change amount of the spherical aberration due to the temperature change becomes large. Therefore, when the objective lens 10 is used in the environmental condition where the temperature difference is caused with respect to the design reference temperature, the reproducing performance for the optical disc D deteriorates.

By satisfying the conditions (1) and (1'), the objective lens 10 achieves the configuration where the coma and the spherical aberration due to the temperature change are effectively suppressed, i.e., the aberrations are suitably corrected. However, when the objective lens 10 is configured to merely satisfy the conditions (1) and (1'), a designer may be allowed to employ such a lens design that the curvature of the first surface 11 of the objective lens 10 is set to be large to secure a necessary entire power of the lens so that the decrease of the lens power due to decrease of the refractive index caused by employing resign as material of the lens is compensated for. If the curvature of the first surface 11 is set to be a large value, the lens thickness inevitably increases to secure the thickness t (i.e., the peripheral thickness) of the outermost part of the objective lens 10, and therefore an adequate working distance WD (i.e., the distance between the protective layer surface of the optical disc D and the second surface 12 of the objective lens 10) can not be secured. When an adequate working distance WD can not be secured, a possibility arises that the objective lens 10 collides with the optical disc D even when a shock given to the optical information recording/reproducing apparatus 100 is slight. For this reason, as described below, the objective lens 10 is configured to achieve the optical performance where the spherical aberration and the coma are suitably corrected, while effectively suppressing the increase of the lens thickness.

More specifically, the objective lens 10 is designed such that the gradient (SAG1)' of the first surface 11 defined at a point of height h on the first surface 11 is expressed by the following expression:

$$(SAG1)' = \frac{d(SAG1)}{dh}$$

$$= \frac{\frac{h}{r}}{\sqrt{1-(1+\kappa)\left(\frac{h}{r}\right)^2}} + 4A_4h^3 + 6A_6h^5 + 8A_8h^7 + \ldots ,$$

and is configured to satisfy the following condition (2):

$$1.40 < (n-1) \cdot (SAG1)'_{MAX} NA^2 < 1.95 \tag{2},$$

where $(SAG1)'_{MAX}$ represents the maximum gradient of the first surface 11 within an effective beam diameter. Hereafter, $(SAG1)'_{MAX}$ is referred to as a maximum first surface gradient.

By satisfying the condition (2), the objective lens 10 achieves the configuration where the gradient of the first surface 11 is suppressed appropriately and the increase of the lens thickness is suppressed effectively.

It should be noted that the maximum first surface gradient (SAG1)' is not determined only by considering the thinning of the lens. The inventors of the present application have discovered that the amount of spherical aberration caused with the temperature change should also be considered when the maximum first surface gradient $(SAG1)'_{MAX}$ is determined.

Figure 2:
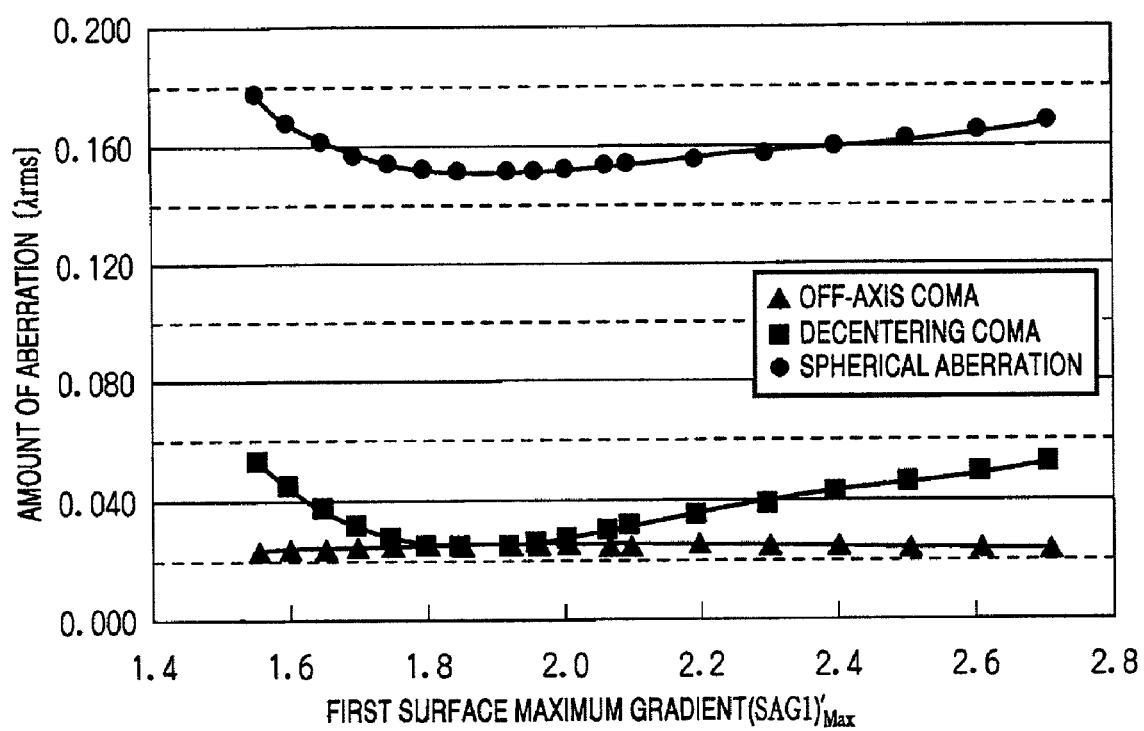
FIG. 2 is a graph illustrating a relationship between the amount of aberration and a maximum first surface gradient $(SAG1)'_{MAX}$.

FIG. 2 is a graph illustrating a relationship between the amount of aberration and the maximum first surface gradient $(SAG1)'_{MAX}$. In the following, the term "off-axis coma" is used to mean a coma caused when the laser beam is converged at a point having a certain image height in a plane substantially perpendicular to the optical axis, and the term "decentering coma" is used to mean a coma caused when the objective lens is decentered due to, for example, an assembling error.

In FIG. 2, the vertical axis represents the amount of aberration (unit: λ rms) and the horizontal axis represents the maximum first surface gradient $(SAG1)'_{MAX}$. In FIG. 2, the curve plotted with "black circle" represents the spherical aberration occurring in the environmental condition lower than the design reference temperature (e.g., 35° C.) by 50° C., the curve plotted with "black triangle" represents the off-axis coma occurring when the laser beam which is inclined by one degree under the design reference temperature is incident on the objective lens, and the curve plotted with "black square" represents the decentering coma occurring when the second surface 12 is decentered by +1 μm with respect to the optical axis of the objective lens 10 under the design reference temperature.

The model of sampled data shown in FIG. 2 corresponds to the objective lens having a focal length of 1.2 mm, NA of 0.85, the lens thickness of 1.36 mm, the refractive index of 1.651, Abbe number at d-line of 27, and the use wavelength of 405 nm. It should be noted that even when the specification of the objective lens 10 is changed, the similar relationship between each aberration and the maximum first surface gradient $(SAG1)'_{MAX}$ shown in FIG. 2 is maintained. That is, the graph of FIG. 2 shows the qualitative relationship between the maximum first surface gradient $(SAG1)'_{MAX}$ and each aberration.

As shown in FIG. 2, the off-axis coma is controlled to have a substantially constant value regardless of the maximum first surface gradient $(SAG1)'_{MAX}$. On the other hand, the spherical aberration and the decentering coma change with change of the maximum first surface gradient $(SAG1)'_{MAX}$. Each of the spherical aberration and the coma takes the maximum value at the maximum first surface gradient $(SAG1)'_{MAX}$ of around 1.8. Each of the spherical aberration and the coma increases as the maximum first surface gradient $(SAG1)'_{MAX}$ increases from around 1.8 or the maximum first surface gradient $(SAG1)'_{MAX}$ decreases from around 1.8.

In consideration of the relationship shown in FIG. 2, the condition (2) is defined such that the maximum first surface gradient $(SAG1)'_{MAX}$ falls within a range where the spherical aberration is small. That is, by satisfying the condition (2), it becomes possible to achieve the balance between each aberration and the gradient of the first surface 11 which is limited to contribute to decrease of the lens thickness as well as suppressing of the change amount of the spherical aberration due to the temperature change.

If the intermediate term of the condition (2) gets smaller than the lower limit of the condition (2), it becomes impossible to compensate for, with the surface shape of the first surface 11, the decrease of the lens power due to decrease of the refractive index caused by employing resin as material of the lens. In this case, in order to secure the necessary entire lens power, the second surface 12 located on the side of the optical disc D needs to contribute to the lens power. As a result, the off-axis coma and the decentering coma can not be suitably corrected while keeping the balance between them, and therefore one of or both of the off-axis coma and the decentering coma increases. Furthermore, the change amount of the spherical aberration due to the temperature change increases. When the intermediate term of the condition (2) gets larger than the upper limit of the condition (2), the gradient of the first surface 11 becomes large, and the lens thickness inevitably increases to secure an adequate peripheral thickness of the lens. As a result, it becomes difficult to secure an adequate working distance WD. Furthermore, in this case, the change amount of the spherical aberration in accordance with the temperature change becomes large.

By satisfying the conditions (1), (1') and (2), it becomes possible to provide an objective lens made of resin configured to achieve the optical performance suitable for information recording/reproducing for the optical disc D while effectively suppressing increase of the lens thickness. By setting the maximum first surface gradient $(SAG1)'_{MAX}$ to be an appropriate value, it becomes possible not only to effectively suppress increase of the lens thickness but also to suitably suppress the change amount of the spherical aberration due to the temperature change.

By satisfying the following condition (3) in addition to the conditions (1), (1') and (2), the objective lens 10 is able to have the further suitable optical performance. When $SC_{0.9}$ denotes the offence against the sine condition at the 90% height within the effective beam radius of the objective lens 10, and $SC_{1.0}$ denotes the offence against the sine condition at the 100% height within the effective beam radius of the objective lens 10, the condition (3) is expressed as follows.

$$-0.010 \leq (SC_{1.0} - SC_{0.9}) \leq -0.001 \quad (3)$$

By satisfying the condition (3) (i.e., by configuring the objective lens 10 such that the offence against the sine condition at the 100% point of the effective beam radius is smaller than the offence against the sine condition at the 90% point of the effective beam radius, and that each offence against the sine condition falls within a certain range), it becomes possible to suppress the amount of the coma more suitably while suppressing the change amount of the spherical aberration due to the temperature change.

Figure 3:
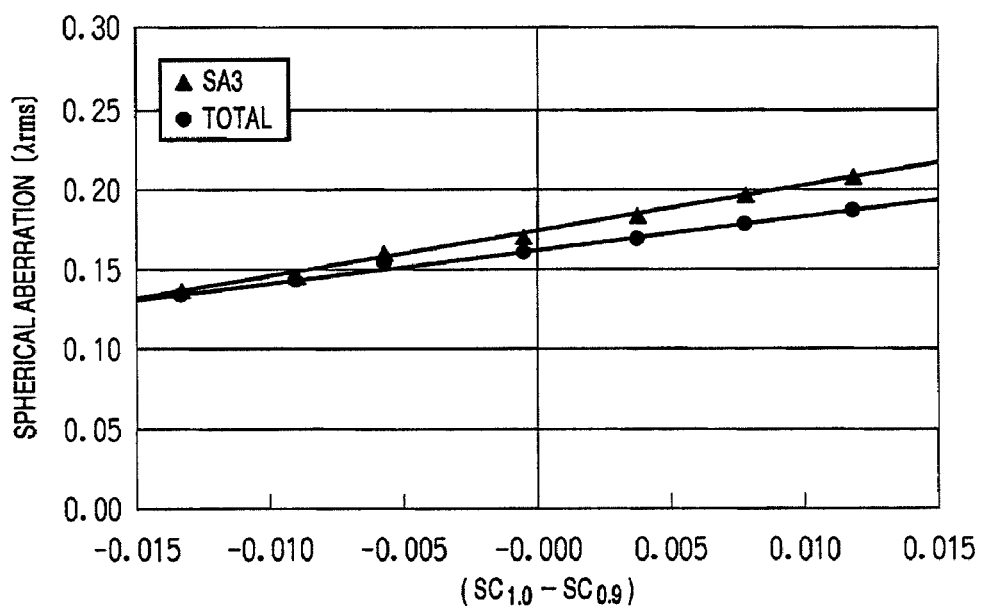
FIG. 3 shows a relationship between the spherical aberration and $(SC_{1.0} - SC_{0.9})$.
Figure 4:
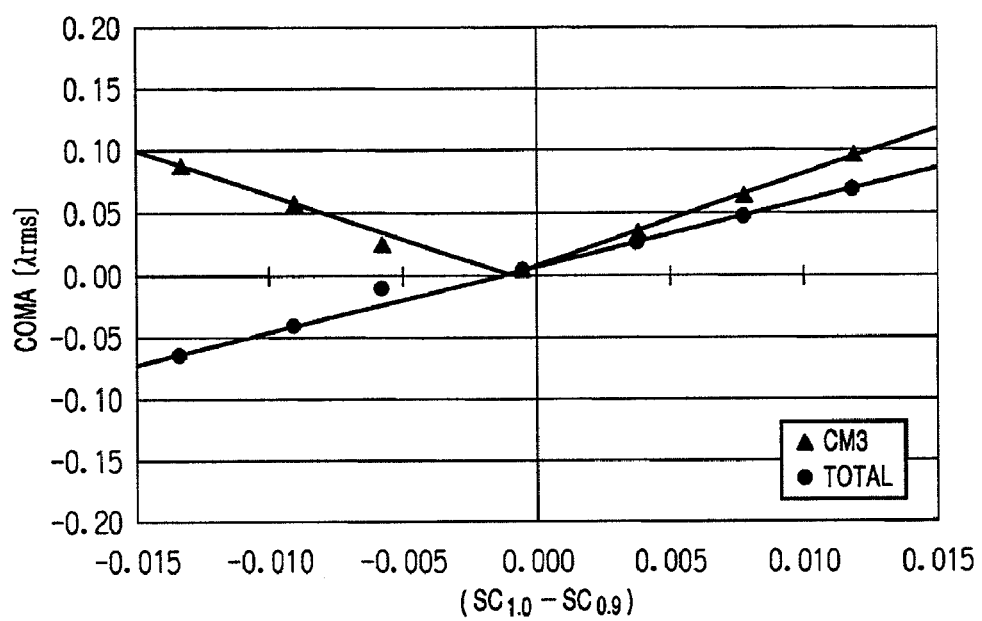
FIG. 4 shows a relationship between the coma and $(SC_{1.0} - SC_{0.9})$.

The inventors have performed various measurements and validations to derive the condition (3), and have founded the relationship between each aberration (unit; arms) and $(SC_{1.0} - SC_{0.9})$. Each of FIGS. 3 and 4 represents such a relationship. In FIG. 3, the vertical axis represents the spherical aberration occurring in the environmental condition lower by 50° C. than the design reference temperature, and the horizontal axis represents $(SC_{1.0} - SC_{0.9})$. In FIG. 3, the line plotted with "black circle" represents the third order spherical aberration, and the line plotted with "black triangle" represents the total amount of the spherical aberration of the third and higher orders.

In FIG. 4, the vertical axis represents the coma caused when a light beam incident on the objective lens 10 is inclined by one degree with respect to the optical axis under the design reference temperature, and the horizontal axis represents $(SC_{1.0} - SC_{0.9})$. In FIG. 4, the line plotted with "black circle" represents the third order coma, and the line plotted with "black triangle" represents the total amount of the coma including the third and higher orders (i.e., the root of the sum of squares of the third order coma, the fifth order coma and the seventh order coma). The model of sampled data shown in FIGS. 3 and 4 is equal to the objective lens shown in FIG. 2. It should be noted that even when the specification of the objective lens 10 is changed, the similar relationship between each aberration and $(SC_{1.0} - SC_{0.9})$ shown in FIGS. 3 and 4 is maintained. That is, the graph of each of FIGS. 3 and 4 shows the qualitative relationship between $(SC_{1.0} - SC_{0.9})$ and each aberration.

As shown in FIG. 3, the amount of the spherical aberration due to the temperature change becomes smaller as the difference between the offence against the sine condition at the 100% point of the effective beam radius and the offence against the sine condition at the 90% point of the effective beam radius increases. Therefore, the objective lens 10 is able to achieve the superior optical performance as $(SC_{1.0} - SC_{0.9})$ becomes smaller. However, as shown in FIG. 4, the third order coma or the total amount of coma of the third and higher orders takes the smallest value when the offence against the sine condition is set to be an unchanging state at the periphery of the effective beam radius, and increases as the offence against the sine condition increases or as the offence against the sine condition decreases in the periphery of the effective beam radius. Therefore, if the objective lens 10 is configured such that $(SC_{1.0} - SC_{0.9})$ takes a small value so that the amount of the spherical aberration due to the temperature change is suppressed, the coma increases. For this reason, the condition (3) is defined to appropriately define the range of $(SC_{1.0} - SC_{0.9})$ so that both of the spherical aberration and the coma can be effectively corrected.

When the intermediate term of the condition (3) gets lower than the lower limit of the condition (3), the coma becomes large, and therefore it becomes difficult to achieve the optical performance suitable for information recording/reproducing for the optical disc D although in this case the spherical aberration due to the temperature change can be suppressed. When the intermediate term of the condition (3) gets larger then the upper limit of the condition (3), the amount of the spherical aberration due to the temperature change becomes large (in this case the coma may also increase depending on conditions), and therefore it becomes difficult to achieve the optical performance suitable for information recording/reproducing for the optical disc D.

By satisfying the following condition (4), the objective lens 10 is able to provide the optical performance achieving more appropriately the object of the present invention. When d (unit: mm) denotes the lens thickness of the objective lens 10 on the optical axis, the condition (4) is expressed as follows.

$$1.70 < d \cdot n/f < 2.10 \quad (4)$$

By satisfying the condition (4), it becomes possible to define the lens thickness d suitable for securing an adequate working distance WD and an adequate peripheral thickness t, while effectively preventing increase of the size of the objective lens 10. When the intermediate term of the condition (4) gets lower than the lower limit of the condition (4), the lens thickness d becomes too small, and therefore it becomes impossible to provide a surface shape (i.e., the curvature) required for securing a desired lens power on the first surface 11. In this case, since the maximum first surface gradient $(SAG1)'_{MAX}$ becomes too large and thereby the degree of sensitivity of the lens becomes too large, the amount of the spherical aberration caused particularly by the temperature change becomes large. When the intermediate term of the condition (4) gets larger than the upper limit of the condition (4), the size of the lens becomes large and the weight of the lens becomes large. In this case, a considerably large burden is placed on the actuator for driving the objective lens 10. Furthermore, in this case, the lens thickness d with respect to the focal length f becomes too large, and therefore it becomes difficult to secure an adequate working distance WD.

There is a case where the condition (4) is not satisfied when the focal length f is not proper. The following condition (5) defines a suitable focal length f for providing the objective lens 10 with the optical performance achieving suitably the object of the present invention.

$$0.70 < f < 1.50 \quad (5)$$

The condition (5) defines the desired focal length to satisfy the condition (4). In other words, the condition (5) defines a suitable focal length to prevent increase of the size of the objective lens 10 while securing an adequate working distance WD. When the focal length f gets smaller than the lower limit of the condition (5), it becomes difficult to secure an adequate working distance WD regardless of the shape of the objective lens 10 because the focal length f is too small. When the focal length f gets larger than the upper limit of the condition (5), the effective diameter of the objective lens 10 becomes large if the required NA for information recording/reproducing for the optical disc D is secured, because the focal length f is too large. Such a configuration is disadvantageous in downsizing the objective lens 10. Furthermore, since the amount of the spherical aberration due to the temperature change becomes large in proportion to the focal length, the reproducing performance for the optical disc D deteriorates as the focal length becomes large.

In the following, eight concrete examples of the optical information recording/reproducing apparatus 100 are described. Each of the following examples has the general configuration shown in FIG. 1.

First Example

Figure 5:
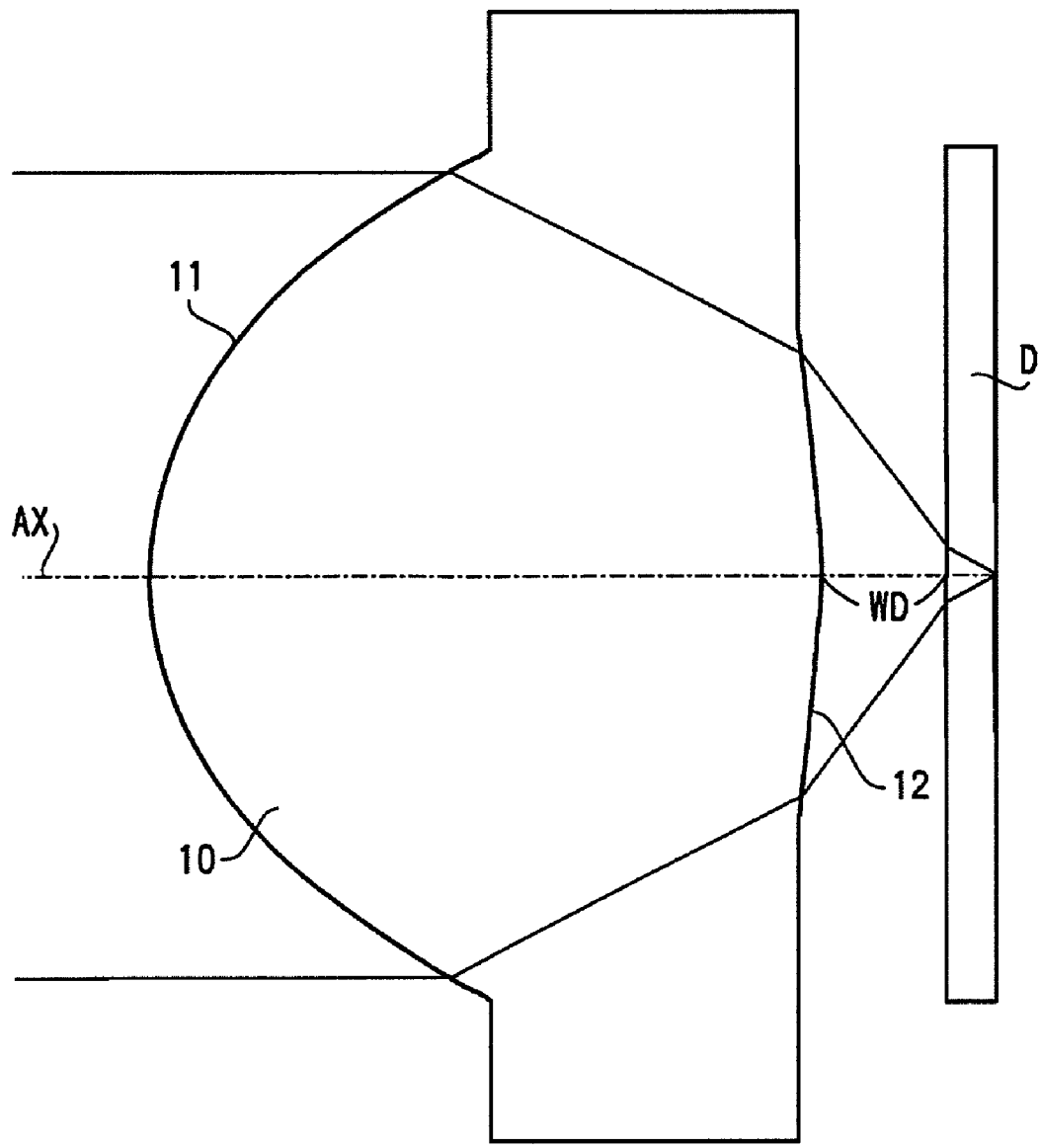
FIG. 5 is an enlarged view illustrating a portion around the objective lens according to a first example.

Hereafter, a first example of the optical information recording/reproducing apparatus 100 is described. FIG. 5 is an enlarged view illustrating the portion around the objective lens 10 according to the first example. Concrete specifications of the objective lens 10 according to the first example, i.e., the wavelength $\lambda$ (unit: nm) of the laser beam used for information recording/reproducing for the optical disc D, the focal length f (unit: mm) of the objective lens 10 and NA defined when the optical disc D is used, are indicated below. It should be noted that the wavelength $\lambda$ used for information recording/reproducing for the optical disc D (i.e., the wavelength of the laser beam emitted from the light source 1) falls within the range defined by the condition (7) even if mode-hopping is taken into consideration.

| | |
|---|---|
| $\lambda$: | 405 |
| f: | 1.00 |
| NA: | 0.80 |

In the following examples, explanation of the numerical configuration focuses on the configuration of the objective lens 10 and components on the optical disc side of the objective lens 10 (i.e., the objective lens 10 and the optical disc D) for the sake of simplicity.

Table 1 shows a specific numerical configuration of the optical information recording/reproducing apparatus 100 according to the first example defined when the optical disc D is used.

TABLE 1

| Surface No. | r | d | n |
|---|---|---|---|
| 1 | 0.685 | 1.326 | 1.560 |
| 2 | −0.938 | 0.243 | |
| 3 | ∞ | 0.100 | 1.622 |
| 4 | ∞ | | |

In Table 1 (and in the following similar Tables), the surface numbers #1 and #2 represent the first surface 11 and the second surface 12 of the objective lens 10, respectively, and the surface numbers #3 and #4 represent the protective layer and the recording surface of the optical disc D, respectively. In Table 1 (and in the following similar Tables), "r" denotes the curvature radius (unit: mm) of each optical surface, and "d" denotes the thickness of an optical component or the distance (unit: mm) from each optical surface to the next optical surface, and "n" represents the refractive index at the use wavelength $\lambda$. For an aspherical optical element, "r" represents the curvature radius on the optical axis.

Each of the first surface 11 (surface #1) and the second surface 12 (surface #2) of the objective lens 10 is an aspherical surface. Each aspherical surface is optimally designed for information recording and information reproducing for the optical disc D. The following Table 2 shows the conical coefficients $\kappa$ and aspherical coefficients $A_4, A_6 \ldots$ of each aspherical surface. In Table 2 (and in the following similar Tables), the notation "E" means the power of 10 with an exponent specified by the number to the right of E (e.g. "E-04" means "×$10^{-4}$").

TABLE 2

| | FIRST SURFACE (#1) | SECOND SURFACE (#2) |
|---|---|---|
| κ | −0.670 | 0.00 |
| A4 | 7.77800E−02 | 5.64200E+00 |
| A6 | 1.01500E−01 | −5.94400E+01 |
| A8 | −3.06200E−01 | 5.40000E+02 |
| A10 | 1.96660E+00 | −3.43660E+03 |
| A12 | −5.78160E+00 | 1.36000E+04 |

TABLE 2-continued

|     | FIRST SURFACE (#1) | SECOND SURFACE (#2) |
|-----|-------------------|---------------------|
| A14 | 8.76660E+00       | −2.98430E+04        |
| A16 | −5.23620E+00      | 2.77180E+04         |

As described above the focal length f, the refractive index n and the use wavelength λ according to the first example satisfy the conditions (5), (6) and (7). Based on the above described numerical values of the first example, "$|SC|_{MAX}/f$", "$(n-1)\cdot(SAG1)'_{MAX}/NA^2$", "$(SC_{1.0}-SC_{0.9})$" and "$d\cdot n/f$" are obtained as 0.000, 1.662, −0.003 and 2.069, respectively. That is, the first example satisfies all of the conditions (1) to (7). Therefore, according to the first example, it is possible to provide an objective lens made of resin configured to effectively suppress increase of the lens thickness while achieving the optical performance suitable for information recording/reproducing for the optical disc D.

In the following, the optical performance of the objective lens 10 according to the first examples is explained with reference to various aberration diagrams.

Figure 6A:
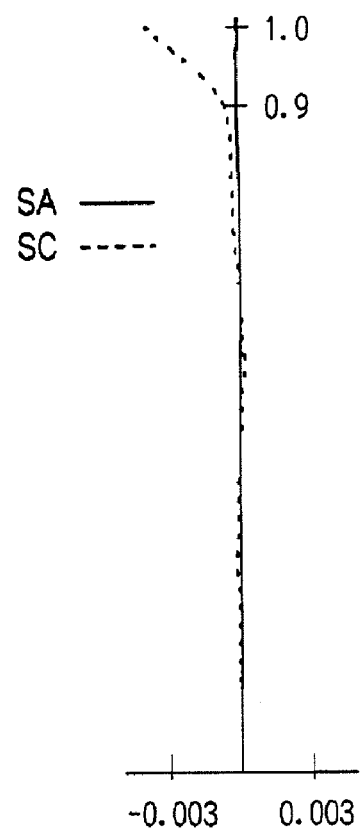
FIG. 6A is a graph illustrating the offence against the sine condition and the spherical aberration caused when an optical disc is used in the first example.
Figure 6B:
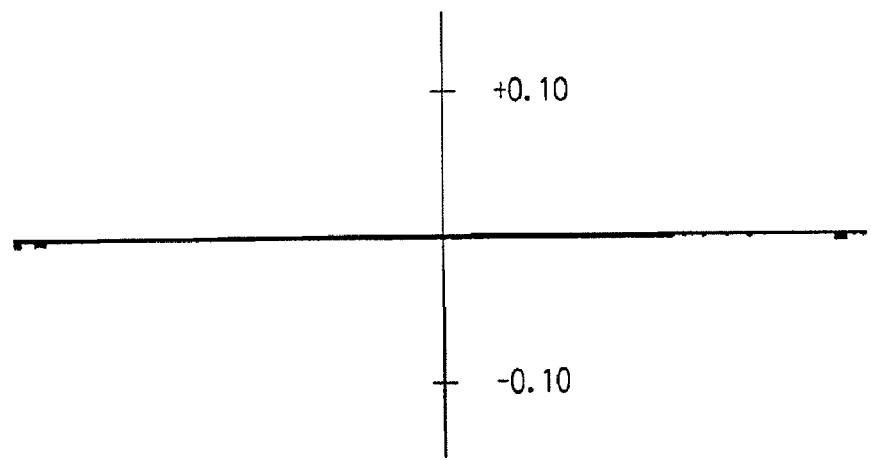
FIG. 6B is an aberration diagram showing the wavefront aberration caused when the optical disc is used in the first example.

FIG. 6A is a graph illustrating the offence against the sine condition SC and the spherical aberration SA caused when the optical disc D is used in the optical information recording/reproducing apparatus 100 according to the first example. FIG. 6B is an aberration diagram showing the wavefront aberration caused when the optical disc D is used in the optical information recording/reproducing apparatus 100 according to the first example. In FIG. 6A (and in the following similar graphs), the vertical axis represents the pupil coordinate, and the horizontal axis represents the amount of the spherical aberration (unit: mm) or the offence against the sine condition. In FIG. 6A (and in the following similar graphs), the curve indicated by a solid line represents the spherical aberration SA at the design wavelength (λ=405 nm), and the curve indicated by a dotted line represents the offence against the sine condition SC. In FIG. 6B (and in the following similar graphs), the vertical axes represents the amount of the wavefront aberration, and the horizontal axis represents the entrance pupil coordinate.

As can be seen from FIG. 6A, the spherical aberration caused when the optical disc D is used in the optical information recording/reproducing apparatus 100 according to the first example is suitably corrected. Further, the offence against the sine condition within the range larger than or equal to 0% and smaller than 90% of the effective beam radius is suitably corrected, and the offence against the sine condition at the 100% point of the effective beam radius is smaller than the offence against the sine condition at the 90% point of the effective beam radius.

Furthermore, within the range of 90% to 100% of the effective beam radius, the offence against the sine condition continuously decreases as the pupil coordinate increases. Therefore, it is understood that the coma is suitably corrected and the occurrence of the spherical aberration due to the temperature change is also suppressed. As can be seen from FIG. 6B, the degree of undulation of the wavefront is small. That is, the amount of the wavefront aberration is small. Since the amount of the wavefront aberration is small, it becomes possible to form a minute beam spot on the recording surface of the optical disc D. As described above, according to the first example, the various aberrations are suitably corrected while securing the NA required for the information recording/reproducing for the optical disc D. Consequently, the precise information recording/reproducing for the optical disc D can be achieved.

Hereafter, the second to eighth examples are explained. The use wavelength λ of each of the second to eighth examples is 405 nm.

Second Example

Figure 7:
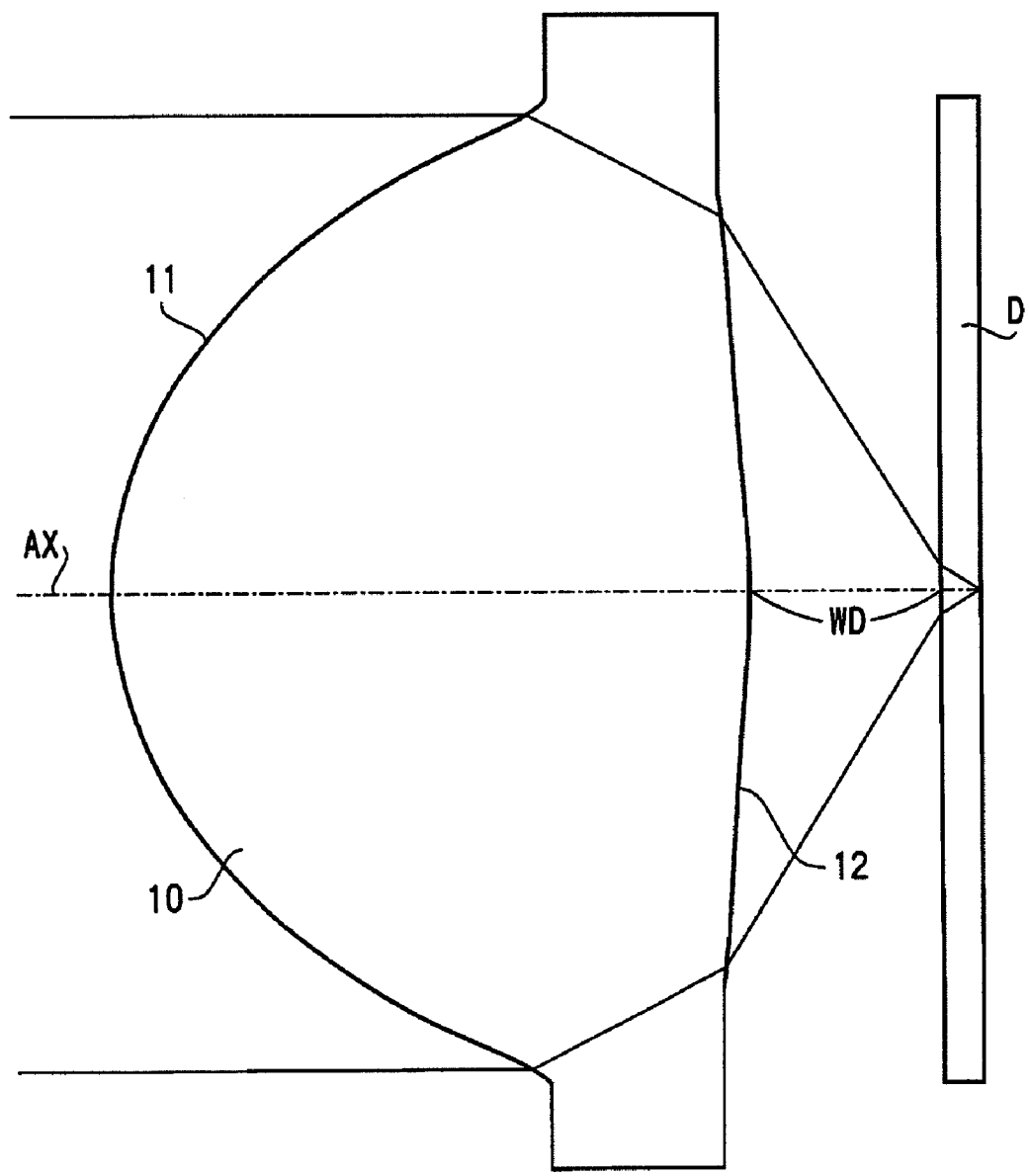
FIG. 7 is an enlarged view illustrating a portion around the objective lens according to a second example.
Figure 8A:
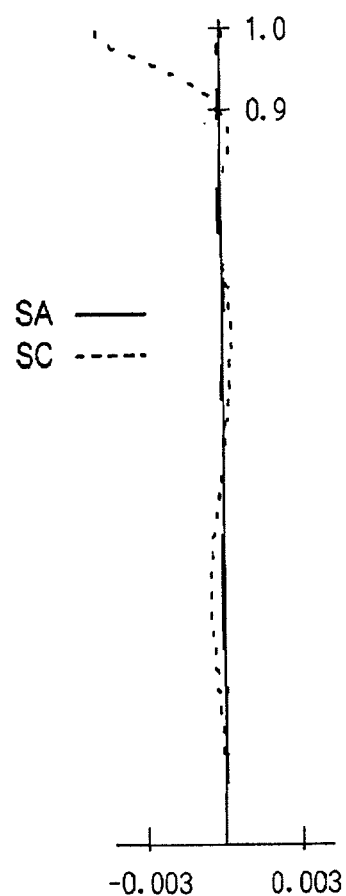
FIG. 8A is a graph illustrating the offence against the sine condition and the spherical aberration caused when the optical disc is used in the second example.
Figure 8B:
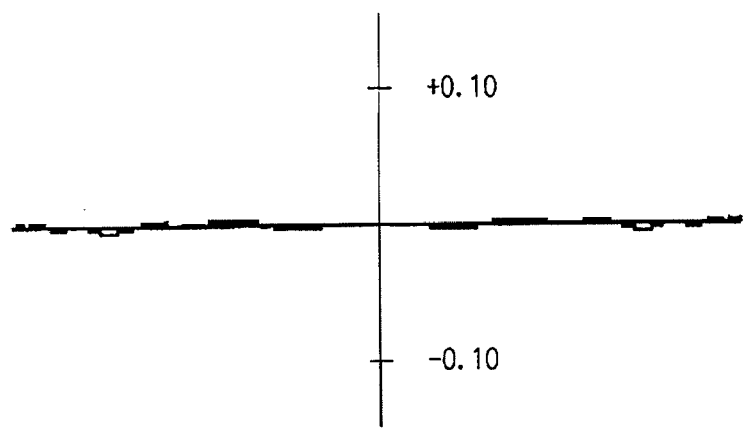
FIG. 8B is an aberration diagram showing the wavefront aberration caused when the optical disc is used in the second example.

FIG. 7 is an enlarged view of the portion around the objective lens 10 according to the second example. FIG. 8A is a graph illustrating the offence against the sine condition SC and the spherical aberration SA caused when the optical disc D is used in the optical information recording/reproducing apparatus 100 according to the second example. FIG. 8B is an aberration diagram showing the wavefront aberration caused when the optical disc D is used in the optical information recording/reproducing apparatus 100 according to the second example. Table 3 shows a specific numerical configuration of the optical information recording/reproducing apparatus 100 according to the second example defined when the optical disc D is used. Table 4 shows the coefficients defining each aspherical surface of the objective lens 10 according to the second example.

TABLE 3

| Surface No. | r      | d      | n     |
|-------------|--------|--------|-------|
| 1           | 0.792  | 1.360  | 1.560 |
| 2           | −1.705 | 0.406  |       |
| 3           | ∞      | 0.0875 | 1.622 |
| 4           | ∞      |        |       |

TABLE 4

|     | FIRST SURFACE (#1) | SECOND SURFACE (#2) |
|-----|--------------------|---------------------|
| κ   | −0.670             | 0.00                |
| A4  | 4.43040E−02        | 1.45670E+00         |
| A6  | 1.33630E−01        | −5.97000E+00        |
| A8  | −9.42200E−01       | 1.89490E+01         |
| A10 | 4.85910E+00        | −3.84190E+01        |
| A12 | −1.43230E+01       | 4.17300E+01         |
| A14 | 2.56430E+01        | −1.15320E+01        |
| A16 | −2.75120E+01       | −2.37650E+01        |
| A18 | 1.63460E+01        | 2.59450E+01         |
| A20 | −4.14380E+00       | −8.19900E+00        |

Third Example

Figure 9:
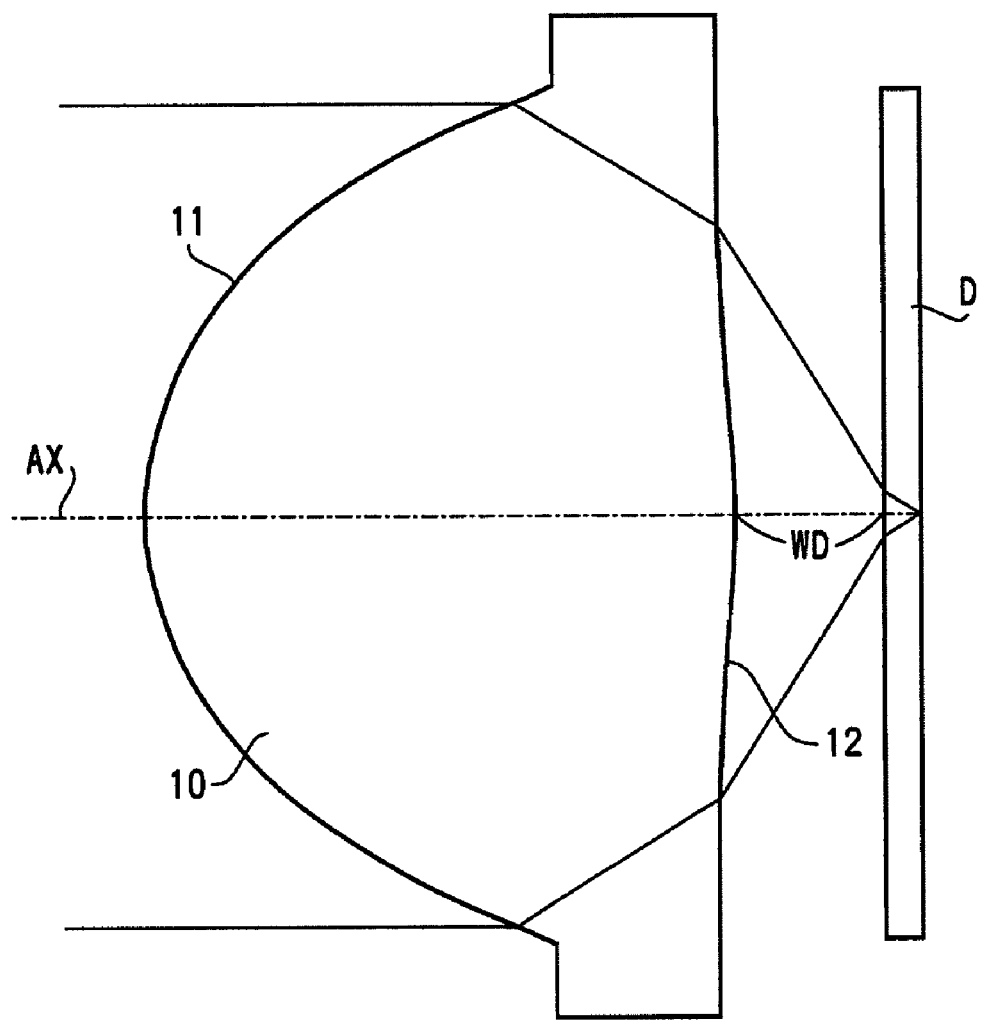
FIG. 9 is an enlarged view illustrating a portion around the objective lens according to a third example.
Figure 10A:
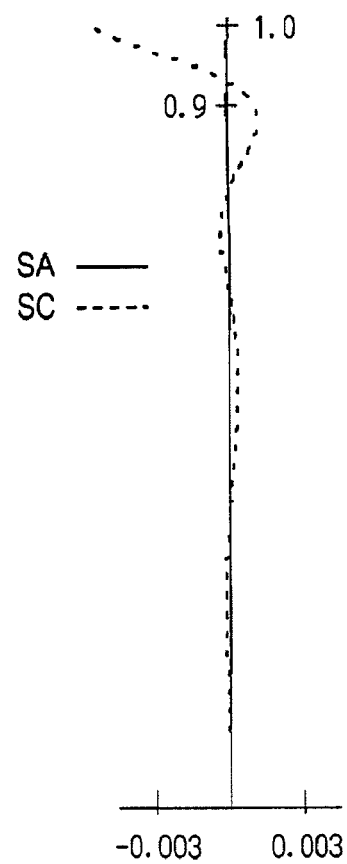
FIG. 10A is a graph illustrating the offence against the sine condition and the spherical aberration caused when the optical disc is used in the third example.
Figure 10B:
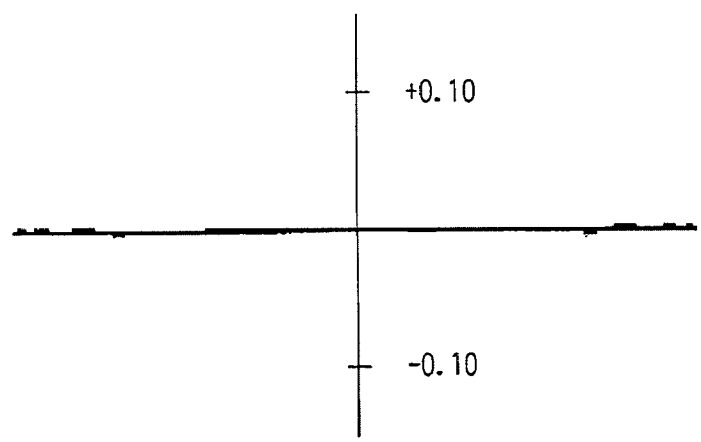
FIG. 10B is an aberration diagram showing the wavefront aberration caused when the optical disc is used in the third example.

FIG. 9 is an enlarged view of the portion around the objective lens 10 according to the third example. FIG. 10A is a graph illustrating the offence against the sine condition SC and the spherical aberration SA caused when the optical disc D is used in the optical information recording/reproducing apparatus 100 according to the third example. FIG. 10B is an aberration diagram showing the wavefront aberration caused when the optical disc D is used in the optical information recording/reproducing apparatus 100 according to the third example. Table 5 shows a specific numerical configuration of the optical information recording/reproducing apparatus 100 according to the third example defined when the optical disc D is used. Table 6 shows the coefficients defining each aspherical surface of the objective lens 10 according to the third example.

TABLE 5

| Surface No. | r | d | n |
|---|---|---|---|
| 1 | 0.798 | 1.450 | 1.560 |
| 2 | −1.483 | 0.363 | |
| 3 | ∞ | 0.0875 | 1.622 |
| 4 | ∞ | | |

TABLE 6

| | FIRST SURFACE (#1) | SECOND SURFACE (#2) |
|---|---|---|
| κ | −0.670 | 0.00 |
| A4 | 4.85130E−02 | 2.06300E+00 |
| A6 | 5.55320E−02 | −1.10000E+01 |
| A8 | −2.15760E−01 | 4.73000E+01 |
| A10 | 1.31260E+00 | −1.35530E+02 |
| A12 | −4.23200E+00 | 2.43500E+02 |
| A14 | 8.24290E+00 | −2.64090E+02 |
| A16 | −9.55070E+00 | 1.58790E+02 |
| A18 | 6.11910E+00 | −4.23510E+01 |
| A20 | −1.66070E+00 | 1.81330E+00 |

Fourth Example

Figure 11:
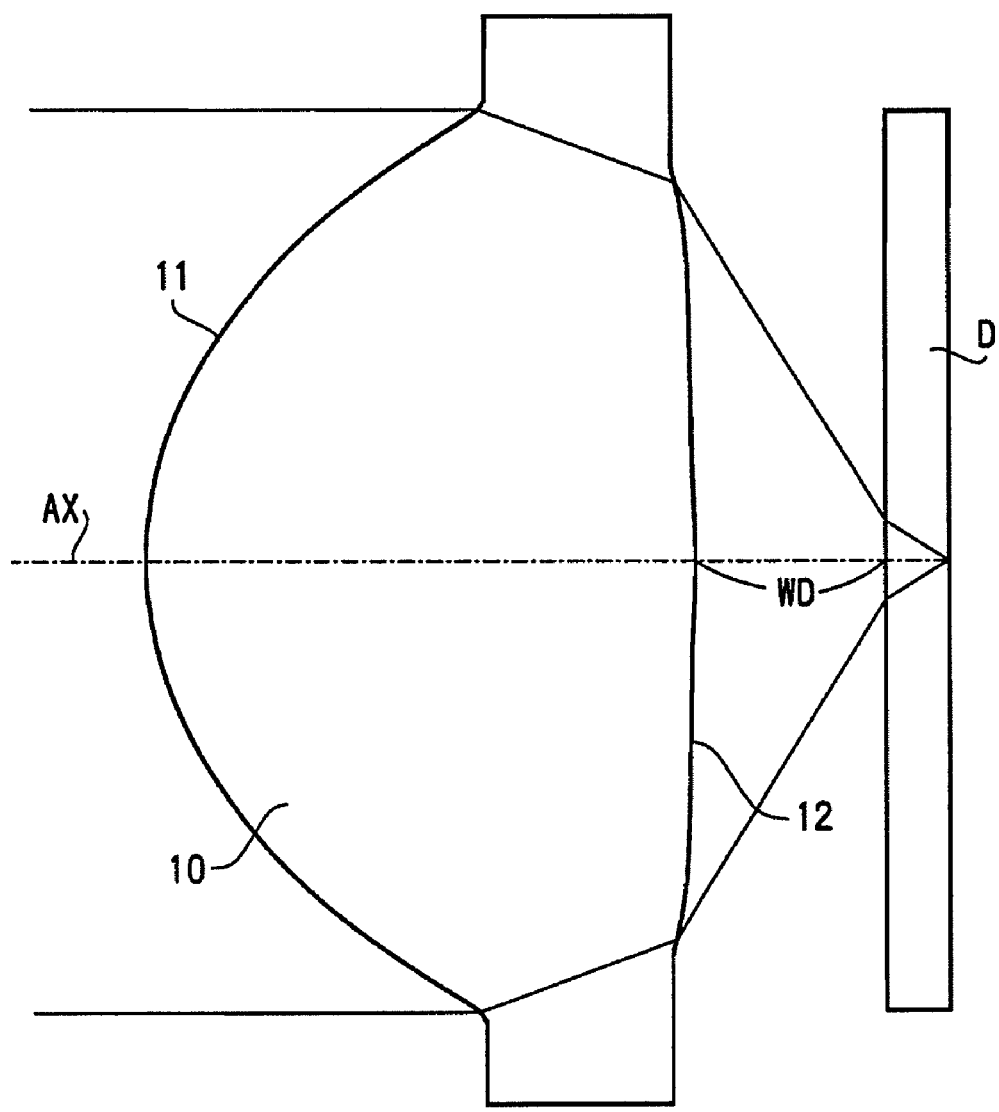
FIG. 11 is an enlarged view illustrating a portion around the objective lens according to a fourth example.
Figure 12A:
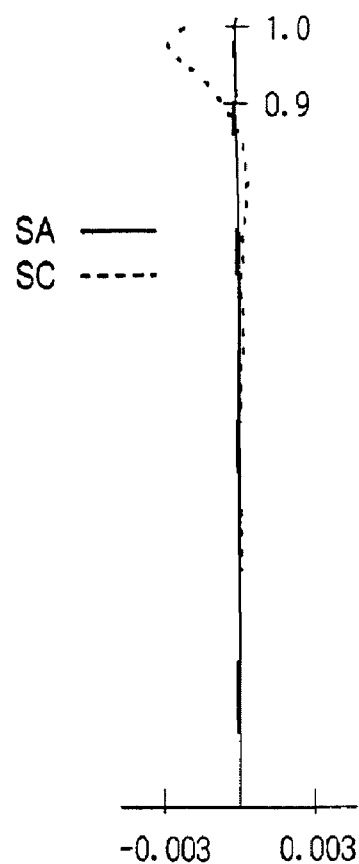
FIG. 12A is a graph illustrating the offence against the sine condition and the spherical aberration caused when the optical disc is used in the fourth example.
Figure 12B:
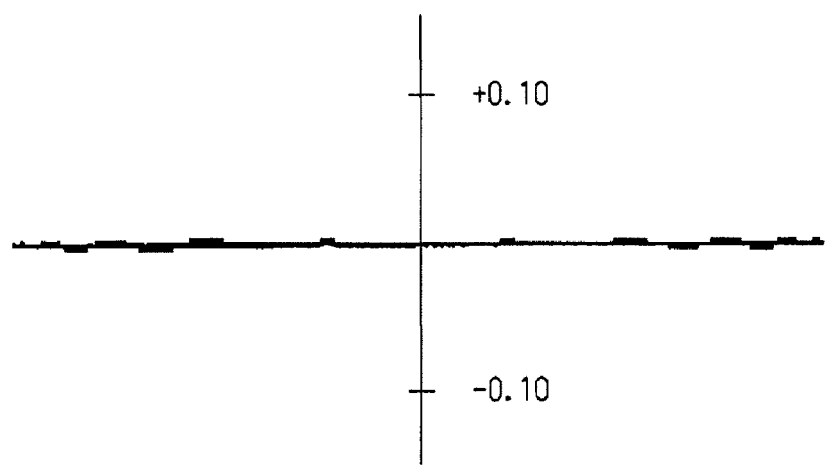
FIG. 12B is an aberration diagram showing the wavefront aberration caused when the optical disc is used in the fourth example.

FIG. 11 is an enlarged view of the portion around the objective lens 10 according to the fourth example. FIG. 12A is a graph illustrating the offence against the sine condition SC and the spherical aberration SA caused when the optical disc D is used in the optical information recording/reproducing apparatus 100 according to the fourth example. FIG. 12B is an aberration diagram showing the wavefront aberration caused when the optical disc D is used in the optical information recording/reproducing apparatus 100 according to the fourth example. Table 7 shows a specific numerical configuration of the optical information recording/reproducing apparatus 100 according to the fourth example defined when the optical disc D is used. Table 8 shows the coefficients defining each aspherical surface of the objective lens 10 according to the fourth example.

TABLE 7

| Surface No. | r | d | n |
|---|---|---|---|
| 1 | 0.536 | 0.780 | 1.651 |
| 2 | −2.335 | 0.266 | |
| 3 | ∞ | 0.0875 | 1.622 |
| 4 | ∞ | | |

TABLE 8

| | FIRST SURFACE (#1) | SECOND SURFACE (#2) |
|---|---|---|
| κ | −0.670 | 0.000 |
| A4 | 1.96650E−01 | 2.71390E+00 |
| A6 | −1.99700E−01 | −2.55090E+01 |
| A8 | 1.04770E+01 | 2.03520E+02 |
| A10 | −1.14060E+02 | −1.22050E+03 |
| A12 | 7.08260E+02 | 4.54920E+03 |
| A14 | −2.47990E+03 | −9.94300E+03 |
| A16 | 4.58900E+03 | 1.14540E+04 |
| A18 | −3.40730E+03 | −4.64040E+03 |
| A20 | −3.55140E+02 | −1.24040E+03 |

Fifth Example

Figure 13:
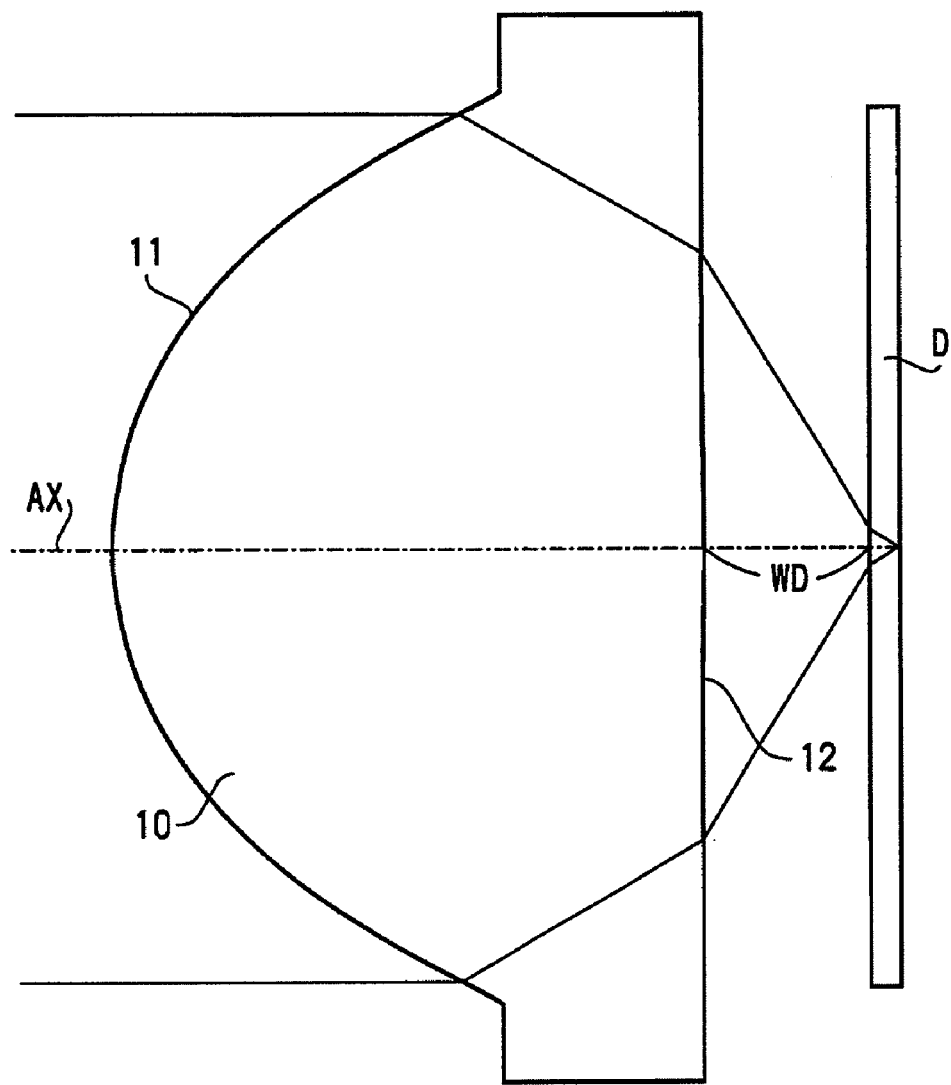
FIG. 13 is an enlarged view illustrating a portion around the objective lens according to a fifth example.
Figure 14A:
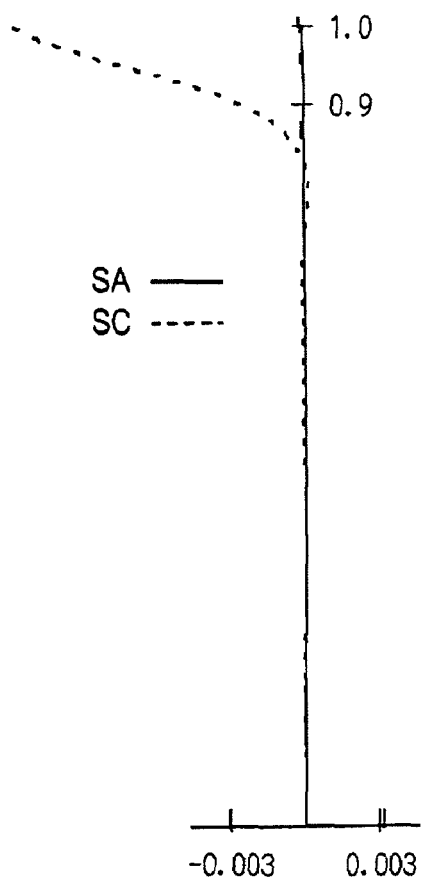
FIG. 14A is a graph illustrating the offence against the sine condition and the spherical aberration caused when the optical disc is used in the fifth example.
Figure 14B:
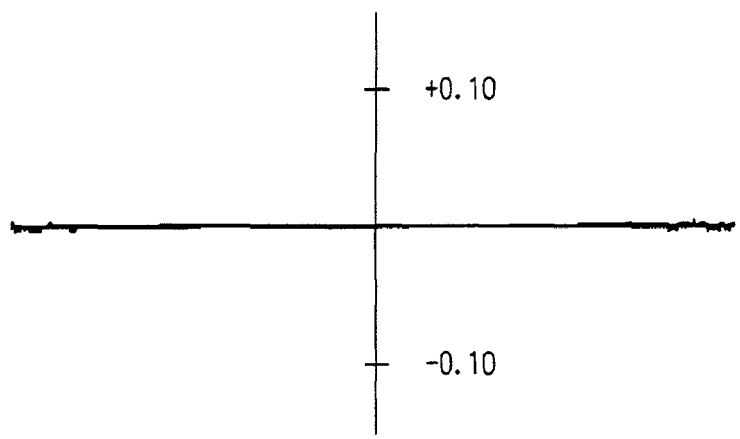
FIG. 14B is an aberration diagram showing the wavefront aberration caused when the optical disc is used in the fifth example.

FIG. 13 is an enlarged view of the portion around the objective lens 10 according to the fifth example. FIG. 14A is a graph illustrating the offence against the sine condition SC and the spherical aberration SA caused when the optical disc D is used in the optical information recording/reproducing apparatus 100 according to the fifth example. FIG. 14B is an aberration diagram showing the wavefront aberration caused when the optical disc D is used in the optical information recording/reproducing apparatus 100 according to the fifth example. Table 9 shows a specific numerical configuration of the optical information recording/reproducing apparatus 100 according to the fifth example defined when the optical disc D is used. Table 10 shows the coefficients defining each aspherical surface of the objective lens 10 according to the fifth example.

TABLE 9

| Surface No. | r | d | n |
|---|---|---|---|
| 1 | 1.042 | 1.700 | 1.651 |
| 2 | −4.182 | 0.470 | |
| 3 | ∞ | 0.0875 | 1.622 |
| 4 | ∞ | | |

TABLE 10

| | FIRST SURFACE (#1) | SECOND SURFACE (#2) |
|---|---|---|
| κ | −0.670 | 0.00 |
| A4 | 2.75010E−02 | 6.34600E−01 |
| A6 | 3.41330E−03 | −2.16170E+00 |
| A8 | 4.46150E−02 | 6.55470E+00 |
| A10 | −1.19350E−01 | −1.41970E+01 |
| A12 | 1.98060E−01 | 1.87280E+01 |
| A14 | −1.85090E−01 | −1.38180E+01 |
| A16 | 9.37130E−02 | 4.80780E+00 |
| A18 | −1.98970E−02 | −4.29300E−01 |

Sixth Example

Figure 15:
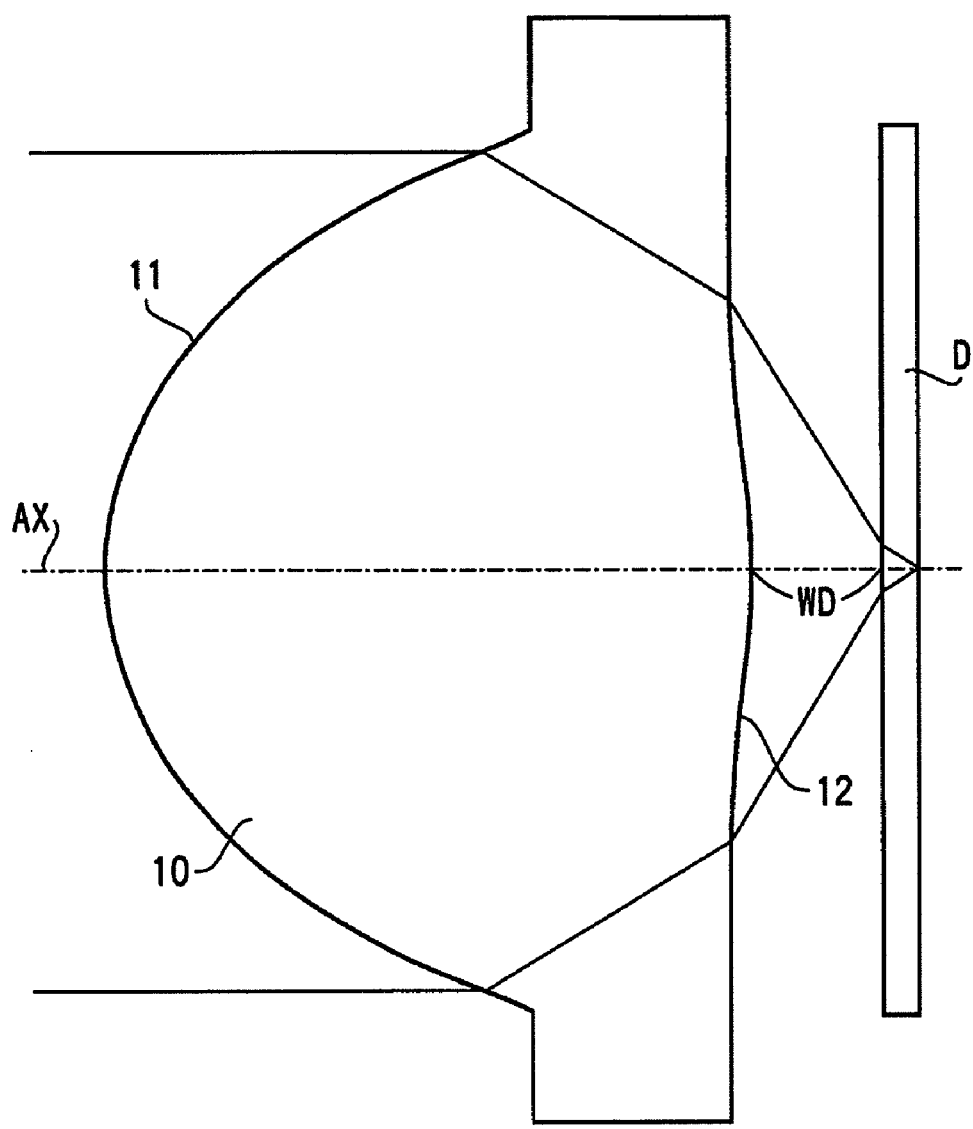
FIG. 15 is an enlarged view illustrating a portion around the objective lens according to a sixth example.
Figure 16A:
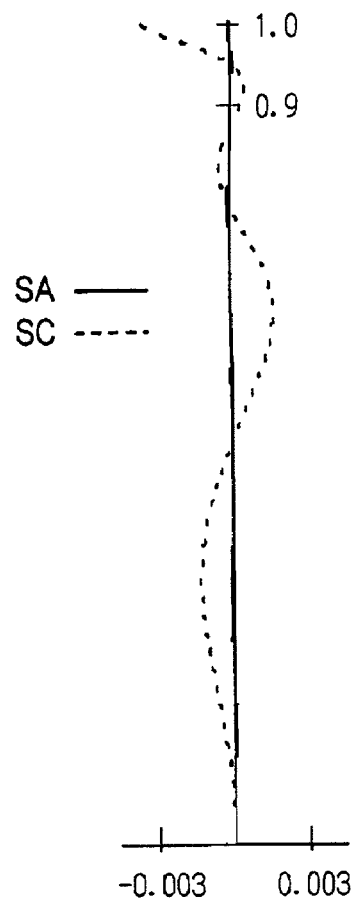
FIG. 16A is a graph illustrating the offence against the sine condition and the spherical aberration caused when the optical disc is used in the sixth example.
Figure 16B:
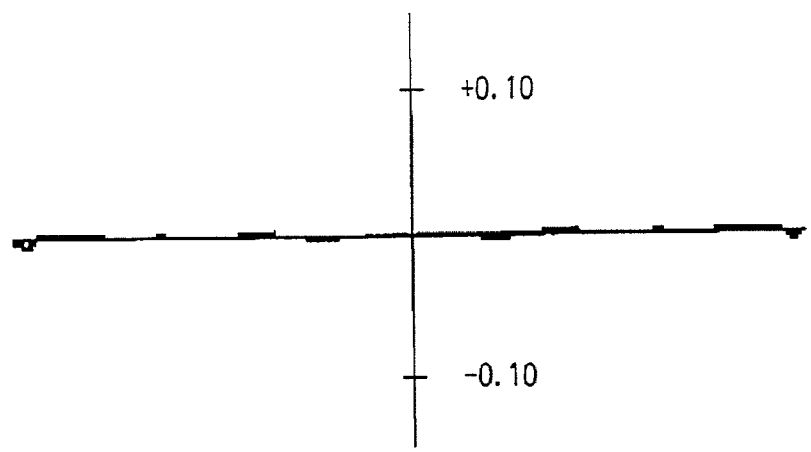
FIG. 16B is an aberration diagram showing the wavefront aberration caused when the optical disc is used in the sixth example.

FIG. 15 is an enlarged view of the portion around the objective lens 10 according to the sixth example. FIG. 16A is a graph illustrating the offence against the sine condition SC and the spherical aberration SA caused when the optical disc D is used in the optical information recording/reproducing apparatus 100 according to the sixth example. FIG. 16B is an aberration diagram showing the wavefront aberration caused when the optical disc D is used in the optical information recording/reproducing apparatus 100 according to the sixth example. Table 11 shows a specific numerical configuration of the optical information recording/reproducing apparatus 100 according to the sixth example defined when the optical disc D is used. Table 12 shows the coefficients defining each aspherical surface of the objective lens 10 according to the sixth example.

TABLE 11

| Surface No. | r | d | n |
|---|---|---|---|
| 1 | 0.768 | 1.550 | 1.525 |
| 2 | −0.959 | 0.305 | |
| 3 | ∞ | 0.0875 | 1.622 |
| 4 | ∞ | | |

TABLE 12

|    | FIRST SURFACE (#1) | SECOND SURFACE (#2) |
|----|---|---|
| κ  | −0.670 | 0.000 |
| A4 | 4.59680E−02 | 3.89000E+00 |
| A6 | 1.14040E−01 | −2.34740E+01 |
| A8 | −7.25260E−01 | 1.04650E+02 |
| A10 | 3.97130E+00 | −2.88130E+02 |
| A12 | −1.21870E+01 | 4.27480E+02 |
| A14 | 2.27460E+01 | −1.58350E+02 |
| A16 | −2.54380E+01 | −4.79330E+02 |
| A18 | 1.56740E+01 | 7.28060E+02 |
| A20 | −4.07080E+00 | −3.24710E+02 |

Seventh Example

Figure 17:
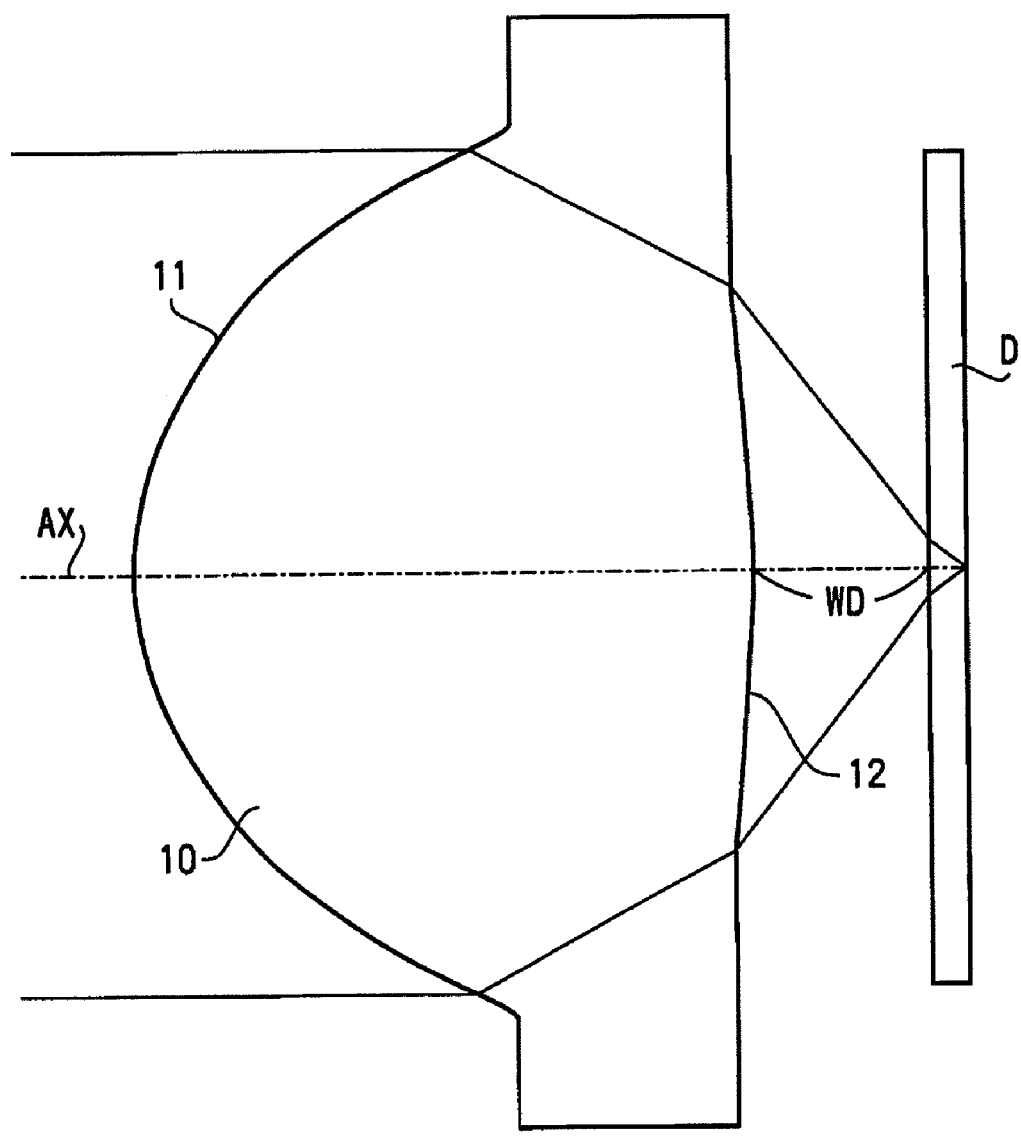
FIG. 17 is an enlarged view illustrating a portion around the objective lens according to a seventh example.
Figure 18A:
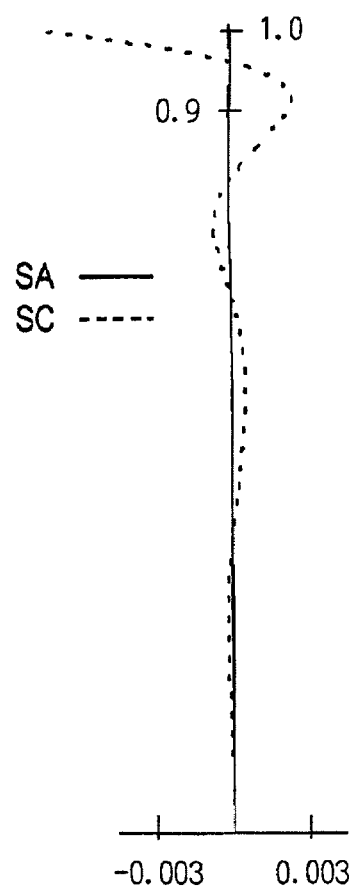
FIG. 18A is a graph illustrating the offence against the sine condition and the spherical aberration caused when the optical disc is used in the seventh example.
Figure 18B:
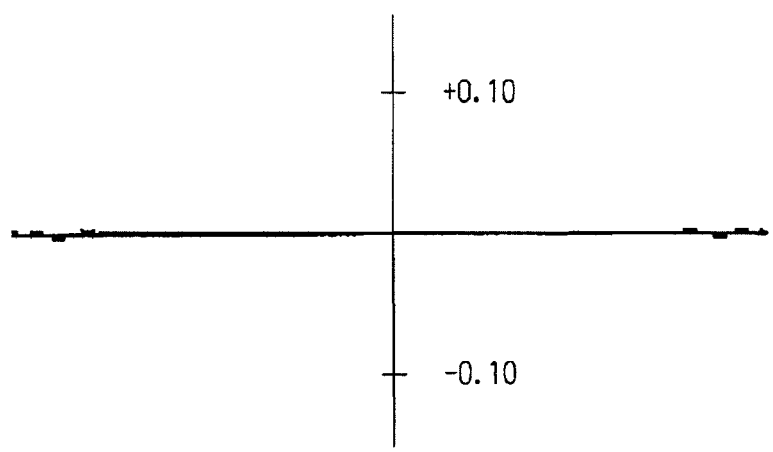
FIG. 18B is an aberration diagram showing the wavefront aberration caused when the optical disc is used in the seventh example.

FIG. 17 is an enlarged view of the portion around the objective lens 10 according to the seventh example. FIG. 18A is a graph illustrating the offence against the sine condition SC and the spherical aberration SA caused when the optical disc D is used in the optical information recording/reproducing apparatus 100 according to the seventh example. FIG. 18B is an aberration diagram showing the wavefront aberration caused when the optical disc D is used in the optical information recording/reproducing apparatus 100 according to the seventh example. Table 13 shows a specific numerical configuration of the optical information recording/reproducing apparatus 100 according to the seventh example defined when the optical disc D is used. Table 14 shows the coefficients defining each aspherical surface of the objective lens 10 according to the seventh example.

TABLE 13

| Surface No. | r | d | n |
|---|---|---|---|
| 1 | 0.892 | 1.570 | 1.560 |
| 2 | −1.830 | 0.443 | |
| 3 | ∞ | 0.0875 | 1.622 |
| 4 | ∞ | | |

TABLE 14

|    | FIRST SURFACE (#1) | SECOND SURFACE (#2) |
|----|---|---|
| κ  | −0.670 | 0.000 |
| A4 | 3.40400E−02 | 1.19100E+00 |
| A6 | 3.19580E−02 | −4.27570E+00 |
| A8 | −1.05470E−01 | 1.02920E+01 |
| A10 | 5.37320E−01 | −9.63200E+00 |
| A12 | −1.48450E+00 | −5.64570E−01 |
| A14 | 2.49300E+00 | −3.67410E+01 |
| A16 | −2.52020E+00 | 1.51240E+02 |

TABLE 14-continued

|    | FIRST SURFACE (#1) | SECOND SURFACE (#2) |
|----|---|---|
| A18 | 1.42080E+00 | −1.96330E+02 |
| A20 | −3.40400E−01 | 8.78520E+01 |

Eighth Example

Figure 19:
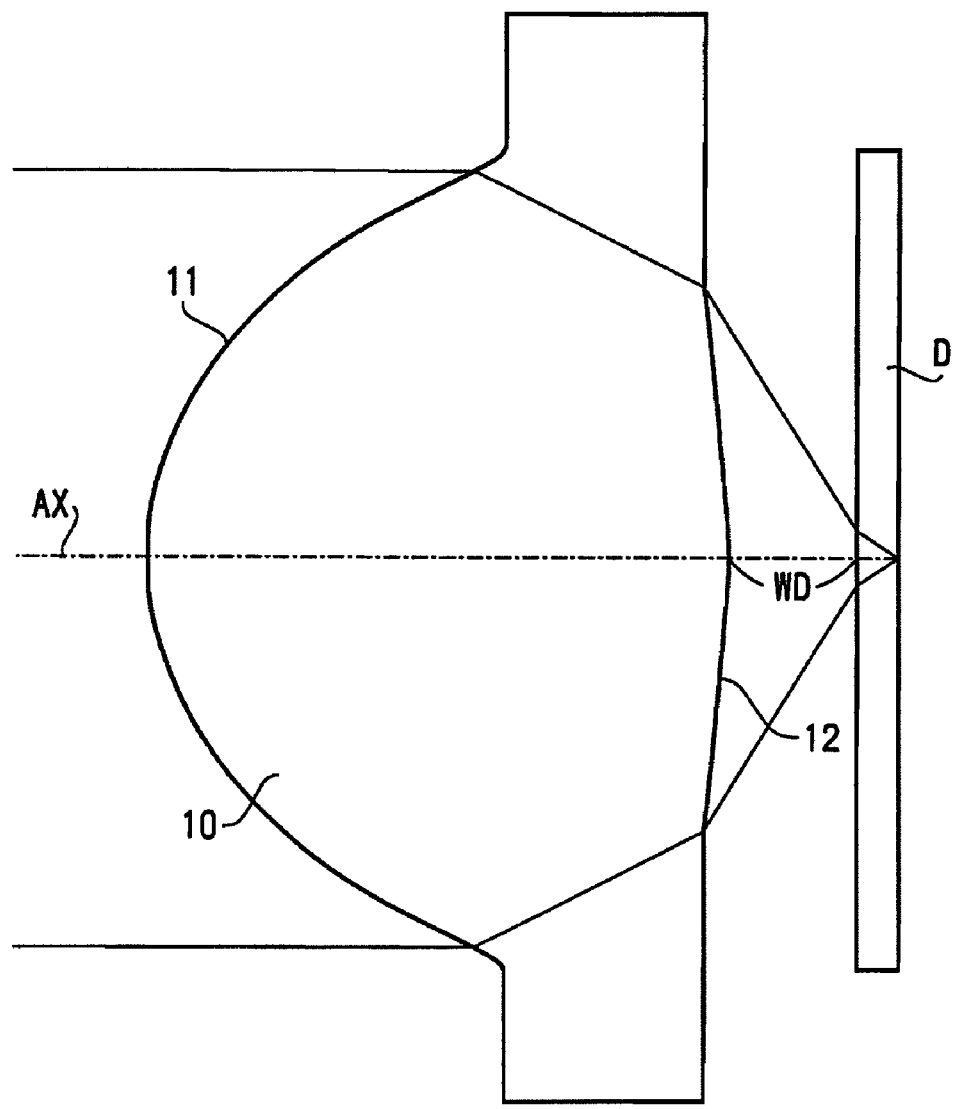
FIG. 19 is an enlarged view illustrating a portion around the objective lens according to an eighth example.
Figure 20A:
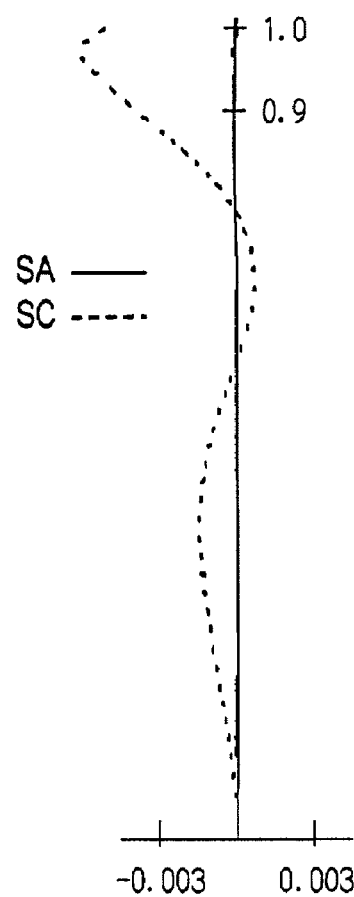
FIG. 20A is a graph illustrating the offence against the sine condition and the spherical aberration caused when the optical disc is used in the eighth example.
Figure 20B:
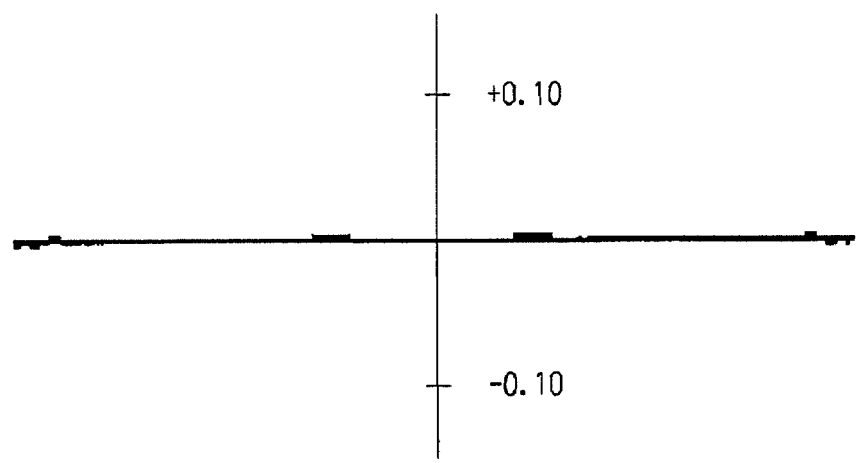
FIG. 20B is an aberration diagram showing the wavefront aberration caused when the optical disc is used in the eighth example.

FIG. 19 is an enlarged view of the portion around the objective lens 10 according to the eighth example. FIG. 20A is a graph illustrating the offence against the sine condition SC and the spherical aberration SA caused when the optical disc D is used in the optical information recording/reproducing apparatus 100 according to the eighth example. FIG. 20B is an aberration diagram showing the wavefront aberration caused when the optical disc D is used in the optical information recording/reproducing apparatus 100 according to the eighth example. Table 15 shows a specific numerical configuration of the optical information recording/reproducing apparatus 100 according to the eighth example defined when the optical disc D is used. Table 16 shows the coefficients defining each aspherical surface of the objective lens 10 according to the eighth example.

TABLE 15

| Surface No. | r | d | n |
|---|---|---|---|
| 1 | 0.635 | 1.190 | 1.560 |
| 2 | −1.009 | 0.254 | |
| 3 | ∞ | 0.0875 | 1.622 |
| 4 | ∞ | | |

TABLE 16

|    | FIRST SURFACE (#1) | SECOND SURFACE (#2) |
|----|---|---|
| κ  | −0.670 | 0.000 |
| A4 | 9.61020E−02 | 4.84700E+00 |
| A6 | 3.24310E−03 | −3.61670E+01 |
| A8 | 1.36280E+00 | 2.00330E+02 |
| A10 | −7.54180E+00 | −7.77720E+02 |
| A12 | 2.50580E+01 | 1.95120E+03 |
| A14 | −4.21810E+01 | −2.76340E+03 |
| A16 | 2.31400E+01 | 1.28440E+03 |
| A18 | 2.37850E+01 | 1.53140E+03 |
| A20 | −2.88910E+01 | −1.65100E+03 |

Table 17 shows the numerical values of the NA and the conditions (1) to (6) according to the second to eighth examples. In Table 17, the numerical values of the first example and two comparative examples which are explained below are also shown.

TABLE 17

| | CONDITION | | | | | | |
|---|---|---|---|---|---|---|---|
| | (1) $|SC|_{MAX}/f$ | (2) $(n-1)\cdot(SAG1)'_{MAX}/NA^2$ | (3) $SC_{1.0} - SC_{0.9}$ | (4) $d \cdot n/f$ | (5) $f$ | (6) $n$ | NA |
| 1$^{ST}$ EXAMPLE | 0.000 | 1.662 | −0.003 | 2.069 | 1.000 | 1.560 | 0.80 |
| 2$^{ND}$ EXAMPLE | 0.000 | 1.710 | −0.005 | 1.768 | 1.200 | 1.560 | 0.85 |
| 3$^{RD}$ | 0.000 | 1.928 | −0.006 | 1.885 | 1.200 | 1.560 | 0.85 |

TABLE 17-continued

| | (1) $|SC|_{MAX}/f$ | (2) $(n-1) \cdot (SAG1)'_{MAX}/NA^2$ | (3) $SC_{1.0} - SC_{0.9}$ | (4) $d \cdot n/f$ | (5) $f$ | (6) $n$ | NA |
|---|---|---|---|---|---|---|---|
| EXAMPLE 4$^{TH}$ | 0.001 | 1.442 | −0.002 | 1.717 | 0.750 | 1.651 | 0.85 |
| EXAMPLE 5$^{TH}$ | 0.000 | 1.817 | −0.009 | 1.909 | 1.470 | 1.651 | 0.85 |
| EXAMPLE 6$^{TH}$ | 0.001 | 1.924 | −0.004 | 2.010 | 1.176 | 1.525 | 0.85 |
| EXAMPLE 7$^{TH}$ | 0.000 | 1.882 | −0.010 | 1.814 | 1.350 | 1.560 | 0.80 |
| EXAMPLE 8$^{TH}$ | 0.001 | 1.554 | −0.001 | 1.975 | 0.940 | 1.560 | 0.85 |
| EXAMPLE 1$^{ST}$ COMPARATIVE EXAMPLE | 0.000 | 2.199 | 0.000 | 1.652 | 1.647 | 1.514 | 0.85 |
| 2$^{ND}$ COMPARATIVE EXAMPLE | 0.002 | 1.977 | −0.004 | 2.069 | 1.000 | 1.560 | 0.80 |

As shown in Table 17, each of the second to eighth examples satisfies all of the conditions (1) to (6). In each of the second to eighth examples, the use wavelength λ, is 405 nm, and therefore the condition (7) is satisfied. Therefore, as in the case of the first example, according to each of the second to eighth examples, it is possible to effectively suppress increase of the lens thickness while achieving the optical performance suitable for the information recording/reproducing for the optical disc D.

As can be seen from graphs of FIGS. 8A, 8B, 10A, 10B, 12A, 12B, 14A, 14B, 16A, 16B, 18A, 18B, 20A and 20B, the various aberrations are suitably corrected while securing the NA required for information recording/reproducing for the optical disc D as in the case of the first example. Consequently, it is possible to achieve the precise information recording/reproducing for the optical disc D.

Figure 21A:
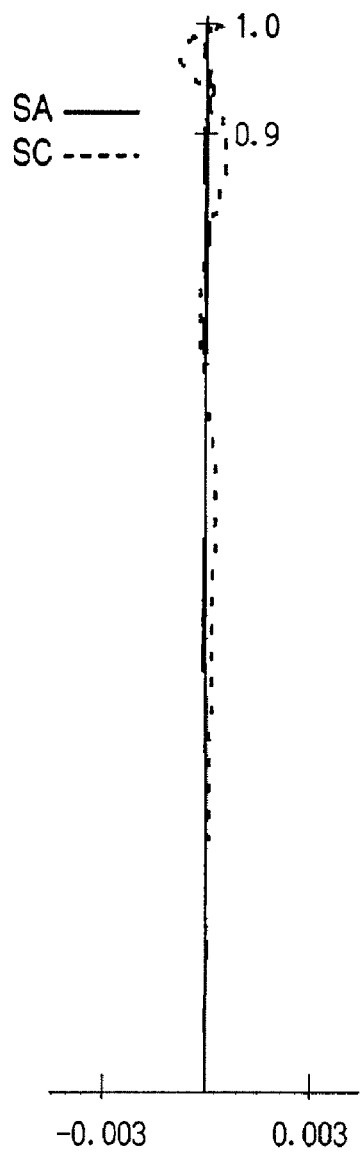
FIG. 21A is an aberration diagram illustrating the spherical aberration and the offence against the sine condition caused when the optical disc is used in a first comparative example.
Figure 21B:
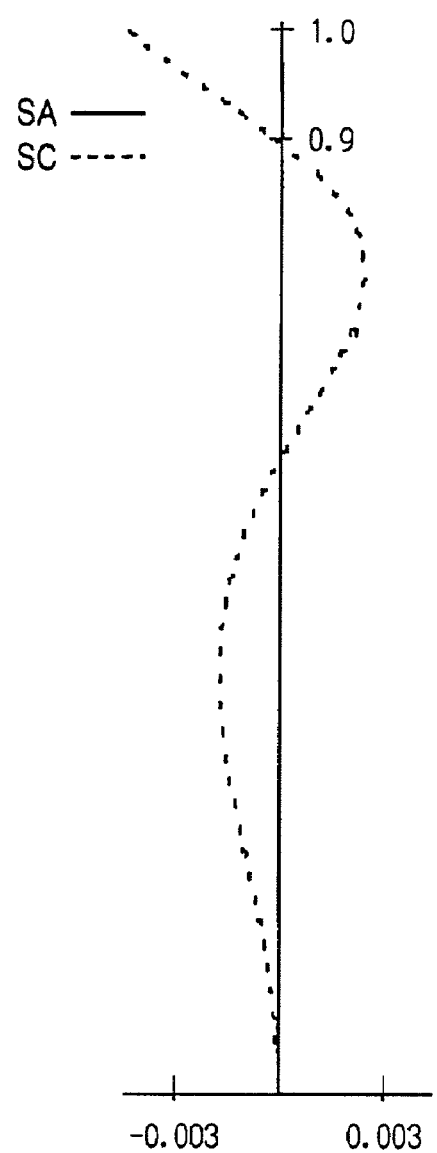
FIG. 21B is an aberration diagram illustrating the spherical aberration and the offence against the sine condition caused when the optical disc is used in a second comparative example.

Hereafter, two comparative examples are explained. FIG. 21A is a graph illustrating the offence against the sine condition SC and the spherical aberration SA caused when the optical disc D is used in an optical information recording/reproducing apparatus according to a first comparative example which corresponds to a first embodiment disclosed in JP2007-179720A. FIG. 21B is a graph illustrating the offence against the sine condition SC and the spherical aberration SA caused when the optical disc D is used in an optical information recording/reproducing apparatus according to a second comparative example which corresponds to a sixth embodiment disclosed in JP2003-85806A.

The use wavelengths λ of the first and second comparative examples are 408 nm and 405 nm, respectively. The numerical values of the NA and the conditions (1) to (6) are shown in Table 17.

As shown in Table 17, the first comparative example does not satisfy the conditions (2) to (5). More specifically, with regard to the first comparative example, the intermediate term of the condition (2) exceeds the upper limit of the condition (2), and therefore the gradient of the surface of the objective lens is large. In this case, the lens thickness of the objective lens inevitably increases to secure the peripheral thickness of the objective lens, and therefore it becomes necessary to secure an adequate working distance WD, for example, by increasing the size of the optical information recording/reproducing apparatus. Furthermore, the first comparative example has a drawback that the change amount of the spherical aberration with respect to the temperature change is large.

Furthermore, the intermediate term of the condition (3) of the first comparative examples exceeds the upper limit of the condition (3). Such a configuration also leads to increase of the spherical aberration due to the temperature change. As a result, it becomes impossible to achieve the optical performance suitable for information recording/reproducing for the optical disc D.

Furthermore, the intermediate term of the condition (4) of the first comparative example is smaller than the lower limit of the condition (4), and the intermediate term of the condition (5) of the first comparative example exceeds the upper limit of the condition (5). In other words, the focal length of the first comparative example is too long, and therefore the effective diameter of the objective lens 10 becomes large when the required NA for information recording/reproducing for the optical disc D is secured. Such a configuration is disadvantageous in regard to downsizing of the objective lens 10. Since the focal length is long, a large amount of spherical aberration is caused in accordance with the temperature change. Consequently, the reproducing performance for the optical disc D deteriorates.

Hereafter, with regard to the first and second examples and the first comparative example, the third order spherical aberration and the total amount of the high order spherical aberrations including the third and higher orders caused under a temperature condition lower by 50° C. than the design reference temperature are considered. For making effective comparisons, the amount of each aberration is calculated in a condition where a common specification is assigned to the objective lenses of the examples. More specifically, each spherical aberration is normalized by the focal length on a basis of NA 0.85. Through such calculation, the third order spherical aberrations of the first and second examples are 0.078 and 0.160, respectively. By contrast, the third order spherical aberration of the first comparative examples is 0.238. The total amounts of the high order spherical aberration including the third and high orders of the first and second examples are 0.081 and 0.168, respectively. By contrast, the total amount of the high order spherical aberration including the third and higher orders of the first comparative example is 0.245.

As described above, since the first comparative example does not satisfy the conditions (2) to (5) (in particular since the first comparative example does not satisfy the condition (2)), the change amount of the spherical aberration due to the temperature change is large, and thereby the reproducing performance for the optical disc D deteriorates.

As sown in Table 17, the second comparative example does not satisfy the conditions (1) and (2). More specifically, since the second comparative example does not satisfy the condition (1), the large amount of coma is caused, and therefore the reproducing performance for the optical disc D deteriorates.

Furthermore, since the intermediate term of the condition (2) of the second comparative example exceeds the upper limit of the condition (2), the gradient of the surface of the objective lens becomes large. Therefore, the lens thickness of the objective lens inevitably increases to secure the peripheral thickness of the objective lens. In this case, it becomes necessary to secure an adequate working distance by increasing the size of the optical information recording/reproducing apparatus.

Furthermore, in the second comparative example, the off-axis coma and the decentering coma are sacrificed in order to suppress the change amount of the spherical aberration due to the temperature change in a condition where the intermediate term of the condition (2) exceeds the upper limit of the condition (2). Therefore, the reproducing performance for the optical disc D deteriorates.

Hereafter, with regard to first and second examples and the second comparative example, the third order coma and the total amount of the higher order coma including the third and higher orders are compared. Through numerical calculation, the third order comas of the first and second examples are obtained as −0.017 and −0.019, respectively. By contrast, the third order coma of the second comparative example is −0.019. With regard to the first and second examples, the total amounts of the high order comas including the third and higher orders are 0.021 and 0.028, respectively. By contrast, the total amount of the high order coma including the third and higher orders of the second comparative example is 0.036. As described above, although the third order coma of the second comparative example is approximately equal to those of the first and second examples, the total amount of the high order coma including the third and higher orders of the second comparative example is larger than that of the each of the first and second examples. Therefore, the second comparative example has a drawback that the reproducing performance deteriorates due to the coma.

As can be seen from the explanation of the first to eighth examples and the comparison between each of the first to eighth examples and the two comparative examples, the first to eighth examples satisfy the conditions (1) to (7). Therefore, it is possible to provide an objective lens made of resin configured to effectively suppress increase of the lens thickness while achieving the optical performance suitable for information recording/reproducing for the optical disc D.

Although the present invention has been described in considerable detail with reference to certain preferred embodiments thereof, other embodiments are possible.

This application claims priority of Japanese Patent Application No. P2008-283091, filed on Nov. 4, 2008. The entire subject matter of the application is incorporated herein by reference.

What is claimed is:

1. An objective lens used for an optical information recording/reproducing apparatus for recording information to and/or reproducing information from an optical disc based on a predetermined standard, the objective lens being made of resin and having a numerical aperture larger than or equal to 0.75;

the objective lens satisfying a condition:

$$0 \leq |SC|_{MAX} f < 0.002 \quad (1)$$

where f denotes a focal length (unit: mm) of the objective lens with respect to a wavelength λ (unit: nm) used for recording information to and/or reproducing information from the optical disc, and $|SC|_{MAX}$ denotes a maximum value of an absolute value an offence against a sine condition defined in a range larger than or equal to 0% and smaller than 90% of an effective beam radius with respect to an optical axis of the objective lens, the objective lens being configured such that the offence against the sine condition at a 100% point of the effective beam radius is smaller than the offence against the sine condition at a 90% point of the effective beam radius, at least a light source side surface of the objective lens being formed to be an aspherical surface, wherein:

when SAG denotes a sag amount defined as a distance between a point on the aspherical surface at a height of h (unit: mm) from the optical axis and a plane tangential to the aspherical surface at the optical axis, r denotes a curvature radius (unit: mm) of the aspherical surface on the optical axis, κ denotes a conical coefficient, and $A_4$, $A_6$, ... denote aspherical coefficients larger than or equal to the fourth order, a gradient (SAG)' of the aspherical surface at the height h is expressed by:

$$(SAG)' = \frac{d(SAG)}{dh};$$

where, $$SAG = \frac{\frac{h^2}{r}}{1 + \sqrt{1 - (1+\kappa)\left(\frac{h}{r}\right)^2}} + A_4 h^4 + A_6 h^6 + A_8 h^8 + \dots\ ;\ \text{and}$$

the objective lens is configured to satisfy a condition:

$$1.40 < (n-1) \cdot (SAG1)'_{MAX}/NA^2 < 1.95 \quad (2),$$

where $(SAG1)'_{MAX}$ represents a maximum gradient of the light source side surface within an effective beam diameter, n denotes a refractive index of the objective lens at the wavelength λ, and NA denotes the numerical aperture of the objective lens defined on a side of the optical disc when the wavelength λ is used.

2. The objective lens according to claim 1, wherein when $SC_{0.9}$ denotes the offence against the sine condition at the 90% point of the effective beam radius, and $SC_{1.0}$ denotes the offence against the sine condition at the 100% point of the effective beam radius, the objective lens further satisfies a condition:

$$-0.010 \leq (SC_{1.0} - SC_{0.9}) \leq -0.001 \quad (3).$$

3. The objective lens according to claim 1, wherein when d (unit: mm) denotes a lens thickness of the objective lens on the optical axis, the objective lens further satisfies a condition:

$$70 < d \cdot n/f < 2.10 \quad (4).$$

4. The objective lens according to claim 1, wherein the objective lens further satisfies a condition:

$$0.70 < f < 1.50 \tag{5}$$

5. The objective lens according to claim 1, wherein the objective lens further satisfies a condition:

$$1.50 < n < 1.66 \tag{6}$$

6. The objective lens according to claim 1, wherein the wavelength λ satisfies a condition:

$$380 < \lambda < 420 \tag{7}$$

7. The objective lens according to claim 1, wherein the objective lens is configured such that the offence against the sine condition continuously decreases within a range of 90 to 100% of the effective beam radius as a pupil coordinate increases.

8. An optical information recording/reproducing apparatus for recording information to and/or reproducing information from an optical disc based on a predetermined standard by using a light beam having a wavelength λ, comprising:
a light source that emits the light beam having the wavelength λ; and
an objective lens,
wherein:
the objective lens is made of resin and has a numerical aperture larger than or equal to 0.75;
the objective lens satisfies a condition:

$$0 \leq |SC|_{MAX}/f < 0.002 \tag{1}$$

where f denotes a focal length (unit: mm) of the objective lens with respect to a wavelength λ (unit: nm) used for recording information to and/or reproducing information from the optical disc, and $|SC|_{MAX}$ denotes a maximum value of an absolute value an offence against a sine condition defined in a range larger than or equal to 0% and smaller than 90% of an effective beam radius with respect to an optical axis of the objective lens;
the objective lens is configured such that the offence against the sine condition at a 100% point of the effective beam radius is smaller than the offence against the sine condition at a 90% point of the effective beam radius;
at least a light source side surface of the objective lens being formed to be an aspherical surface;
when SAG denotes a sag amount defined as a distance between a point on the aspherical surface at a height of h (unit: mm) from the optical axis and a plane tangential to the aspherical surface at the optical axis, r denotes a curvature radius (unit: mm) of the aspherical surface on the optical axis, κ denotes a conical coefficient, and $A_4$, $A_6$, ... denote aspherical coefficients larger than or equal to the fourth order, a gradient (SAG)' of the aspherical surface at the height h is expressed by:

$$(SAG)' = \frac{d(SAG)}{dh};$$

where, $$SAG = \frac{\frac{h^2}{r}}{1 + \sqrt{1 - (1+\kappa)\left(\frac{h}{r}\right)^2}} + A_4 h^4 + A_6 h^6 + A_8 h^8 + \ldots \; ; \text{ and}$$

the objective lens is configured to satisfy a condition:

$$40 < (n-1) \cdot (SAG1)'_{MAX}/NA^2 < 1.95 \tag{2}$$

where $(SAG1)'_{MAX}$ represents a maximum gradient of the light source side surface within an effective beam diameter, n denotes a refractive index of the objective lens at the wavelength λ, and NA denotes the numerical aperture of the objective lens defined on a side of the optical disc when the wavelength λ is used.

9. The optical information recording/reproducing apparatus according to claim 8, wherein when $SC_{0.9}$ denotes the offence against the sine condition at the 90% point of the effective beam radius, and $SC_{1.0}$ denotes the offence against the sine condition at the 100% point of the effective beam radius, the objective lens further satisfies a condition:

$$-0.010 \leq (SC_{1.0} - SC_{0.9}) \leq -0.001 \tag{3}$$

10. The optical information recording/reproducing apparatus according to claim 8, wherein when d (unit: mm) denotes a lens thickness of the objective lens on the optical axis, the objective lens satisfies a condition:

$$1.70 < d \cdot n/f < 2.10 \tag{4}$$

11. The optical information recording/reproducing apparatus according to claim 8, wherein the objective lens satisfies a condition:

$$0.70 < f < 1.50 \tag{5}$$

12. The optical information recording/reproducing apparatus according to claim 8, wherein the objective lens satisfies a condition:

$$1.50 < n < 1.66 \tag{6}$$

13. The optical information recording/reproducing apparatus according to claim 8, wherein the wavelength λ satisfies a condition:

$$380 < \lambda < 420 \tag{7}$$

14. The optical information recording/reproducing apparatus according to claim 8, wherein the objective lens is configured such that the offence against the sine condition continuously decreases within a range of 90 to 100% of the effective beam radius as a pupil coordinate increases.

* * * * *